United States Patent
Fukada

(10) Patent No.: US 12,536,315 B2
(45) Date of Patent: Jan. 27, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masanori Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 18/462,525

(22) Filed: Sep. 7, 2023

(65) Prior Publication Data

US 2024/0095387 A1    Mar. 21, 2024

(30) Foreign Application Priority Data

Sep. 21, 2022   (JP) ................. 2022-150527

(51) Int. Cl.
*G06F 21/62* (2013.01)
*G06F 21/84* (2013.01)
*G06V 20/62* (2022.01)
*G06V 30/14* (2022.01)

(52) U.S. Cl.
CPC .......... *G06F 21/6218* (2013.01); *G06F 21/84* (2013.01); *G06V 20/62* (2022.01); *G06V 30/1444* (2022.01); *G06V 2201/10* (2022.01)

(58) Field of Classification Search
CPC ..... G06F 21/6218; G06F 21/84; G06V 20/62; G06V 30/1444; G06V 2201/10
See application file for complete search history.

(56) References Cited

U.S. PATENT DOCUMENTS

| | | | |
|---|---|---|---|
| 2021/0303616 A1* | 9/2021 | Fukada | G06F 16/164 |
| 2023/0140152 A1* | 5/2023 | Fukada | G06T 5/50 382/103 |
| 2025/0118097 A1* | 4/2025 | Fukada | H04N 21/845 |

FOREIGN PATENT DOCUMENTS

| | | |
|---|---|---|
| JP | 2004-343627 A | 12/2004 |
| JP | 2020-127244 A | 8/2020 |

\* cited by examiner

*Primary Examiner* — Han Yang
(74) *Attorney, Agent, or Firm* — Venable LLP

(57) ABSTRACT

An image processing apparatus that processes an image file having a structure that includes a plurality of pieces of image data and metadata relating to the plurality of pieces of image data. The apparatus includes a determining unit configured to determine whether the structure is a file structure in which privacy information can be included in data, among the plurality of pieces of image data and the metadata, that is not to be displayed at a first priority, and a display control unit configured, when the determining unit determines that the structure is a file structure in which privacy information can be included in the data, to display identification information capable of identifying the structure as a file structure in which privacy information can be included in the data.

20 Claims, 19 Drawing Sheets

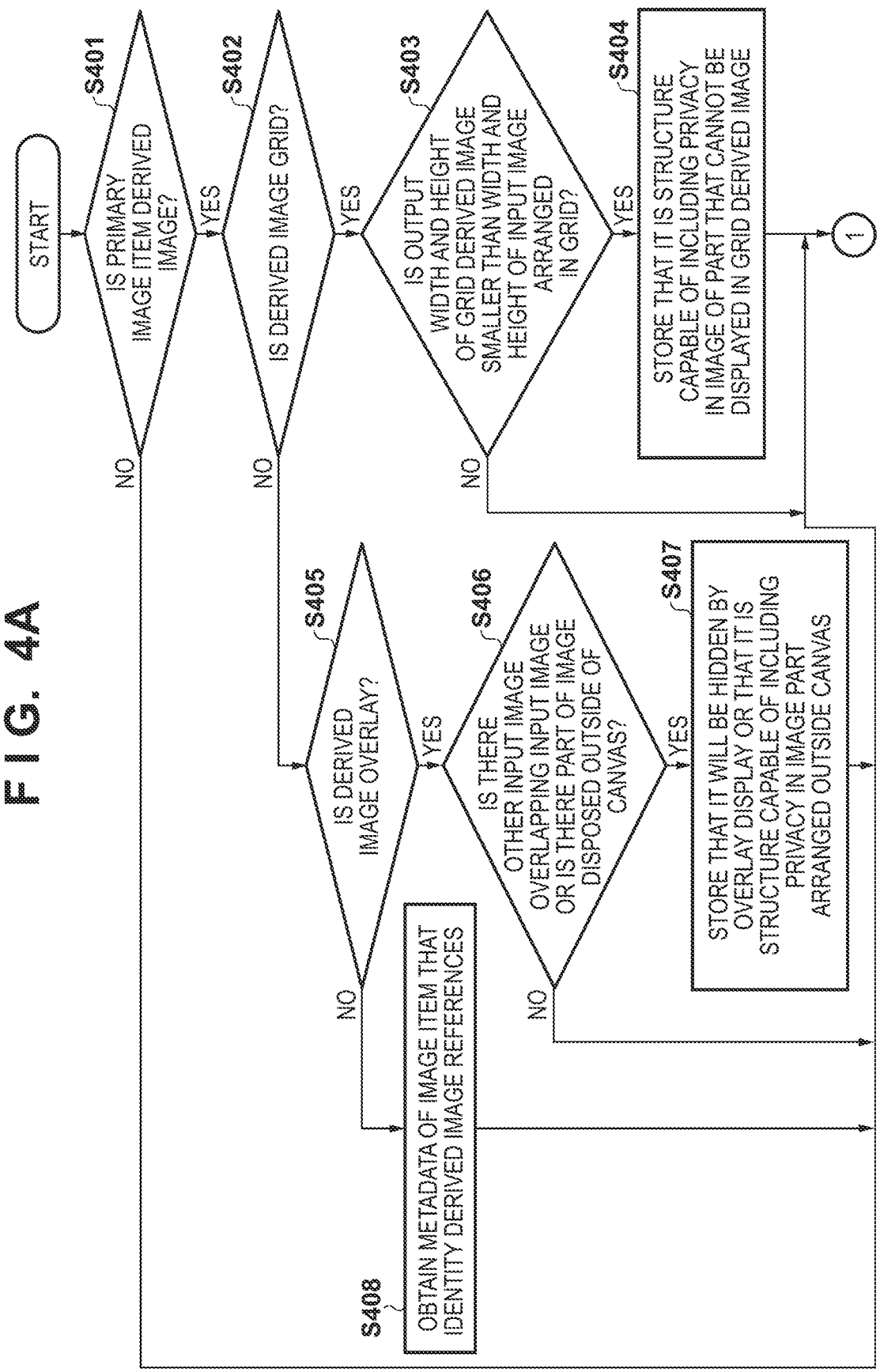
F I G. 4A

FIG. 5A

```
501 ~ FileTypeBox 'ftyp': major-brand='mif1' minorVersion=0 compatible-brands='heic'
       PrivacyConsiderationTypeBox 'pctp': entry_count=4
             1) privacy_consideration_type=1 no_privacy_flag=1; ~511
             2) privacy_consideration_type=5 no_privacy_flag=1; ~512
             3) privacy_consideration_type=6 no_privacy_flag=0; ~513
             4) privacy_consideration_type=9 no_privacy_flag=1; ~514
502  MetaBox 'meta':        (container)
          HandlerBox 'hdlr':'pict' ~515
          PrimaryItemBox 'pitm': item_ID=25; ~516
          ItemInfoBox 'iinf': entry_count=28
                1)'infe': item_ID=1, item_type='hvc1';//input image1
                ...
503             24)'infe': item_ID=24, item_type='hvc1';//input image24
                25)'infe': item_ID=25, item_type='grid';//grid derived image    ~517
                26)'infe': item_ID=26, item_type='hvc1';//thumnail image
                27)'infe': item_ID=27, item_type='rgan';//region
                28)'infe': item_ID=28, item_type='Exif';//exif
          ItemLocationBox 'iloc': item_count=28
                item_ID=1, construction_method=0, data_reference_index=0, base_offset=0,   ~518
                      extent_count=1, {extent_offset=O1, extent_length=L1};
                ...
                item_ID=28, construction_method=0, data_reference_index=0, base_offset=0,
                      extent_count=1, {extent_offset=O28, extent_length=L28}
                                                                                      519
          ItemReferenceBox 'iref':
                referenceType='dimg',from_item_ID=25,ref_count=1,to_item_ID=1,2,...23,24; ~531
                referenceType='thmb',from_item_ID=26,ref_count=1,to_item_ID=25; ~532
                referenceType='cdsc',from_item_ID=27,ref_count=1,to_item_ID=25; ~533
                referenceType='cdsc',from_item_ID=28,ref_count=1,to_item_ID=25; ~534    520
          ItemDataBox 'idat':
                ImageGrid: rows_minus_one=3, columuns_minus_one=5, output_width=4032, output_height=3024
```

FIG. 5B

```
ItemPropertiesBox 'iprp':
    ItemPropertyContainerBox 'ipco':
        1)'hvcC'://ENCODED PARAMETER
        2)'hvcC'://ENCODED PARAMETER
        3)'ispe'; width = 4032, height = 3024
        4)'ispe'; width = 1024, height = 1024
        5)'ispe'; width = 768, height = 576
        6)'udes'; lang:JP, name:CONTACT TELEPHONE NUMBER
            description:090-1234-5678 tags: PERSONAL INFORMATION
    ItemPropertyAssociation 'ipma': entry_count=5
        1)     item_ID=1, association_count=2
                    essential=1, property_index=1;
                    essential=0, property_index=4;
               ...
        24)    item_ID=24, association_count=2
                    essential=1, property_index=1;
                    essential=0, property_index=4;
        25)    item_ID=25, association_count=2
                    essential=0, property_index=3;
        26)    item_ID=26, association_count=1
                    essential=1, property_index=2;
                    essential=0, property_index=5;
        27)    item_ID=27, association_count=1
                    essential=0, property_index=6;
MovieBox 'moov'
    MoovieHeaderBox 'mvhd':
    TrackBox 'trak':
        TrackHeaderBox 'tkhd':
        MediaBox 'mdia':
            MediaHeaderBox 'mdhd':
            HandlerBox 'hdlr': hdlrType=pict    ~522
            MediaInformationBox 'minf':
MediaDataBox 'mdat':
    HEVC Image Data
    ...
    HEVC Image Data
    HEVC Image Sequence Data
    Region Item Data
        reference_width=4032, reference_heigh=3024, region_count=1, geometry_type=1,  ~523
        x=x0, y=y0, width=w0, height=h0
    Exif Data Block
```

```
aligned (8) Class PrivacyConsiderationTypeBox
    extends FullBox(type='pctp',version=0,flags=0)  ~601
{
    unsingd int(8) entry_count;  ~602
    for (i=1; i <= entry_count; i++) {
        unsinged int(7) privacy_consideration_type;  ~603
        bit(1) no_privacy_flag;  ~604
    }
}
```

FIG. 7

```
aligned (8) Class AccessibilityTextPropety
    extends ItemFullProperty(property_type='altt',version=0,flags=0)  ~701
{
    utf8string alt_text;  ~702
    utf8string alt_lang;  ~703
}
```

FIG. 8

```
aligned (8) Class UserDescriptionPropety
    extends ItemFullProperty(property_type='udes',version=0,flags=0)  ~801
{
    utf8string lang;  ~802
    utf8string name;  ~803
    utf8string description;  ~804
    utf8string tags;  ~805
}
```

FIG. 9

```
aligned(8) class ImageGrid {
    unsigned int(8) version = 0;
    unsigned int(8) flags;
    unsigned int FieldLength = ((flags & 1) + 1) * 16;      ~ 901
    unsigned int(8) rows_minus_one;                          ~ 902
    unsigned int(8) columns_minus_one;                       ~ 903
    unsigned int(FieldLength) output_width;                  ~ 904
    unsigned int(FieldLength) output_height;                 ~ 905
}
```

FIG. 10

```
aligned(8) class ImageOverlay {
    unsigned int(8) version = 0;
    unsigned int(8) flags;
    for (j=0; j<4; j++) {
        unsigned int(16) canvas_fill_value;                  ~ 1001
    }
    unsigned int FieldLength = ((flags & 1) + 1) * 16;       ~ 1002
    unsigned int(FieldLength) output_width;                  ~ 1003
    unsigned int(FieldLength) output_height;                 ~ 1004
    for (i=0; i<reference_count; i++) {
        signed int(FieldLength) horizontal_offset;           ~ 1005
        signed int(FieldLength) vertical_offset;             ~ 1006
    }
}
```

FIG. 11A

```
aligned (8) class RegionItem {
    unsigned int(8) version = 0;
    unsigned int(8) flags;
    field_size = ((flags & 1) + 1) * 16;  ——1101
    unsigned int(field_size) reference_width;  ⎫
    unsigned int(field_size) reference_height; ⎭——1102
    unsigned int(8) region_count; ——1103
    for (r=0; r < region_count; r++) {
        unsigned int(8) geometry_type; ——1104
        if (geometry_type == 0) {
            // point
            signed int(field_size) x;  ⎫
            signed int(field_size) y;  ⎭——1105
        }
        else if (geometry_type == 1) {
            // rectangle
            signed int(field_size) x;  ⎫
            signed int(field_size) y;  ⎭——1106
            unsigned int(field_size) width;  ⎫
            unsigned int(field_size) height; ⎭——1107
        }
        else if (geometry_type == 2) {
            // ellipse
            signed int(field_size) x;  ⎫
            signed int(field_size) y;  ⎭——1108
            unsigned int(field_size) radius_x;  ⎫
            unsigned int(field_size) radius_y;  ⎭——1109
        }
```

FIG. 11B

```
else if (geometry_type == 3 || geometry_type == 6) {
    // polygon or polyline
    unsigned int(field size) point_count;  ~1110
    for (i=0; i < point_count; i++) {
        signed int(field_size) px;
        signed int(field_size) py;      }~1111
    }
}
else if (geometry_type == 4) {
    //referenced mask
    signed int(field_size) x;
    signed int(field_size) y;      }~1112
    unsigned int (field_size) width;
    unsigned int (field_size) height;  }~1113
}
else if (geometry_type == 5) {
    //inline mask
    signed int(field_size) x;
    signed int(field_size) y;      }~1114
    unsigned int (field_size) width;
    unsigned int (field_size) height;  }~1115
    unsigned int(8) mask_coding_method;  ~1116
    if (mask_coding_method != 0)
        unsigned int(32) mask_coding_parameters;  ~1117
    bit(8) data[ ];  ~1118
    }
}
}
```

F I G. 21
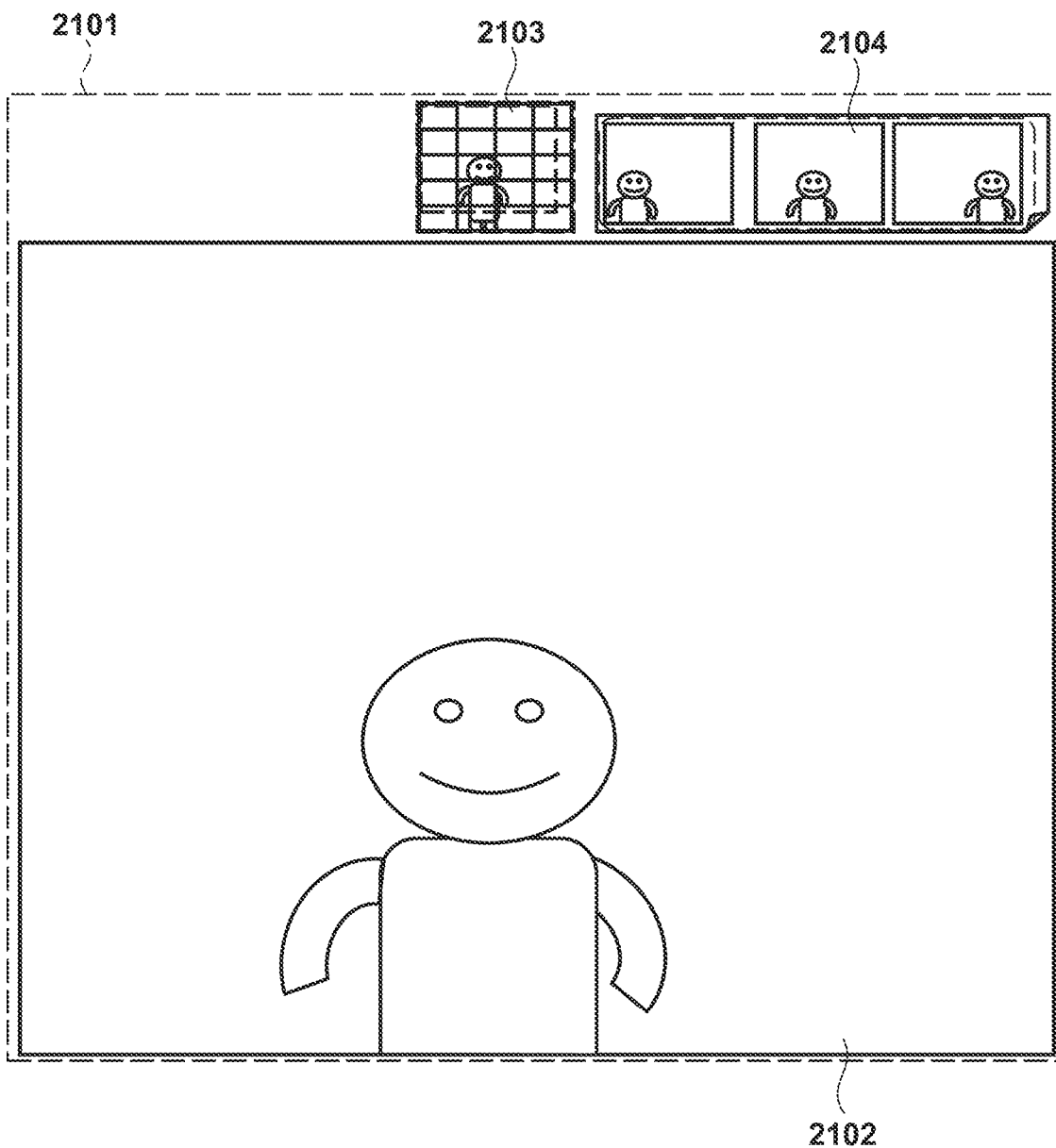

IMAGE PROCESSING APPARATUS, IMAGE PROCESSING METHOD, AND NON-TRANSITORY COMPUTER-READABLE STORAGE MEDIUM

CROSS-REFERENCE TO PRIORITY APPLICATION

This application claims the benefit of Japanese Patent Application No. 2022-150527, filed Sep. 21, 2022, which is hereby incorporated by reference herein in its entirety.

FIELD OF THE INVENTION

The present invention relates to a technique for handling image files.

DESCRIPTION OF THE RELATED ART

In recent years, there are file formats in which a plurality of still images or moving images are encoded and the result is stored as a single image file, which is anticipated to make it easy to manage image groups of images that are highly related to each other, such as image sequences including bursts of still images. For example, a file format called High Efficiency Image File Format (HEIF), which is internationally standardized in ISO/IEC 23008-12, can store still images encoded using H.265 (HEVC), H.266 (VVC), AV1, or a similar codec as a single image file. For such a file format, a normative structure that includes metadata is defined, which specifies the method for associating the metadata with stored images and the configuration of metadata in a specific format. Additionally, by writing in a metadata region, a single image representation constituted by a plurality of still images, called a "derived image", can be recorded as an image file. Because the structure is capable of storing a plurality of images, it is possible to specify a primary item using metadata as a system for specifying an image to display at a first priority.

Japanese Patent Laid-Open No. 2020-127244 discloses a file structure that encapsulates sub-video corresponding to each of tiles obtained by dividing an overall frame of a moving image, and an overall video relating to the entire frame as a composite of the sub-video, such that only some spatial parts of the moving image can be extracted and played back.

Meanwhile, Exif is known as a type of metadata stored in an image file. This Exif metadata can be used to store various data, such as shooting conditions, GPS information indicating the shooting location, and the like, in association with image data in a single file. Data such as GPS information is not normally displayed when playing back and displaying the image stored in an image file. Accordingly, if an end user publicizes an image file on the Internet, or the like, without knowing that GPS information has been added to the image file, the user's privacy information may be unintentionally leaked. In response to such an issue, according to Japanese Patent Laid-Open No. 2004-343627, when transferring a captured image file over a communication network such as the Internet, additional information included in the image file aside from the image information is automatically deleted. This ensures the image file is transferred with only the minimum necessary image information, which prevents shooting information and personal information from being leaked.

The file disclosed in Japanese Patent Laid-Open No. 2020-127244 is capable of storing various metadata, a plurality of pieces of image data, and the like in a single file. Accordingly, even if additional information aside from the image information is automatically deleted as per the method disclosed in Japanese Patent Laid-Open No. 2004-343627, doing so will not necessarily ensure that privacy is protected. In other words, it is conceivable that privacy information is present in the image data itself, which is not normally displayed with priority when playing back and displaying image files, or in parts of images which are not to be displayed, metadata, and the like.

SUMMARY OF THE INVENTION

The present invention provides a technique for making it possible to identify whether a file has a structure in which data stored in an image file that is not to be displayed with priority contains privacy information.

According to a first aspect of the present invention, an image processing apparatus that processes an image file having a structure that includes a plurality of pieces of image data and metadata relating to the plurality of pieces of image data, comprises a determining unit configured to determine whether the structure is a file structure in which privacy information can be included in data, among the plurality of pieces of image data and the metadata, that is not to be displayed at a first priority, and a display control unit configured, when the determining unit determines that the structure is a file structure in which privacy information can be included in the data, to display identification information capable of identifying the structure as a file structure in which privacy information can be included in the data.

According to a second aspect of the present invention, an image processing apparatus that generates an image file having a structure including a plurality of pieces of image data and metadata relating to the plurality of pieces of image data, comprises a determining unit configured to determine whether the structure is a file structure in which privacy information can be included in data, among the plurality of pieces of image data and the metadata, that is not to be displayed at a first priority, and a generating unit configured, when the determining unit determines that the structure is a file structure in which privacy information can be included in the data, to generate the image file by adding, to the image file as metadata, identification information capable of identifying the structure as a file structure in which privacy information can be included in the data.

According to a third aspect of the present invention, an image processing method performed by an image processing apparatus, the image processing apparatus processing an image file having a structure including a plurality of pieces of image data and metadata relating to the plurality of pieces of image data, comprises determining whether the structure is a file structure in which privacy information can be included in data, among the plurality of pieces of image data and the metadata, that is not to be displayed at a first priority, and, when it is determined in the determining that the structure is a file structure in which privacy information can be included in the data, displaying identification information capable of identifying the structure as a file structure in which privacy information can be included in the data.

According to a fourth aspect of the present invention, an image processing method performed by an image processing apparatus, the image processing apparatus generating an image file having a structure including a plurality of pieces of image data and metadata relating to the plurality of pieces of image data, comprises determining whether the structure is a file structure in which privacy information can be included in data, among the plurality of pieces of image data and the metadata, that is not to be displayed at a first priority, and, when it is determined in the determining that the structure is a file structure in which privacy information can be included in the data, generating the image file by adding, to the image file as metadata, identification information capable of identifying the structure as a file structure in which privacy information can be included in the data.

Further features of the present invention will become apparent from the following description of exemplary embodiments with reference to the attached drawings.

BRIEF DESCRIPTION OF THE DRAWINGS

FIGS. 4A to 4C are a flowchart illustrating image file metadata structure analysis processing.

FIGS. 5A and 5B are diagrams illustrating an example of an output HEIF file.

FIG. 6 is a diagram illustrating a PrivacyConsideration-TypeBox structure.

FIG. 7 is a diagram illustrating an AccessibilityTextProperty structure.

FIG. 8 is a diagram illustrating a UserDescriptionProperty structure.

FIG. 9 is a diagram illustrating an ImageGrid derived image structure.

FIG. 10 is a diagram illustrating an ImageOverlay derived image structure.

FIGS. 11A and 11B are diagrams illustrating a RegionItem structure.

FIG. 21 is a diagram illustrating an example of a display UI in image file playback processing.

DESCRIPTION OF THE EMBODIMENTS

Figure 1:
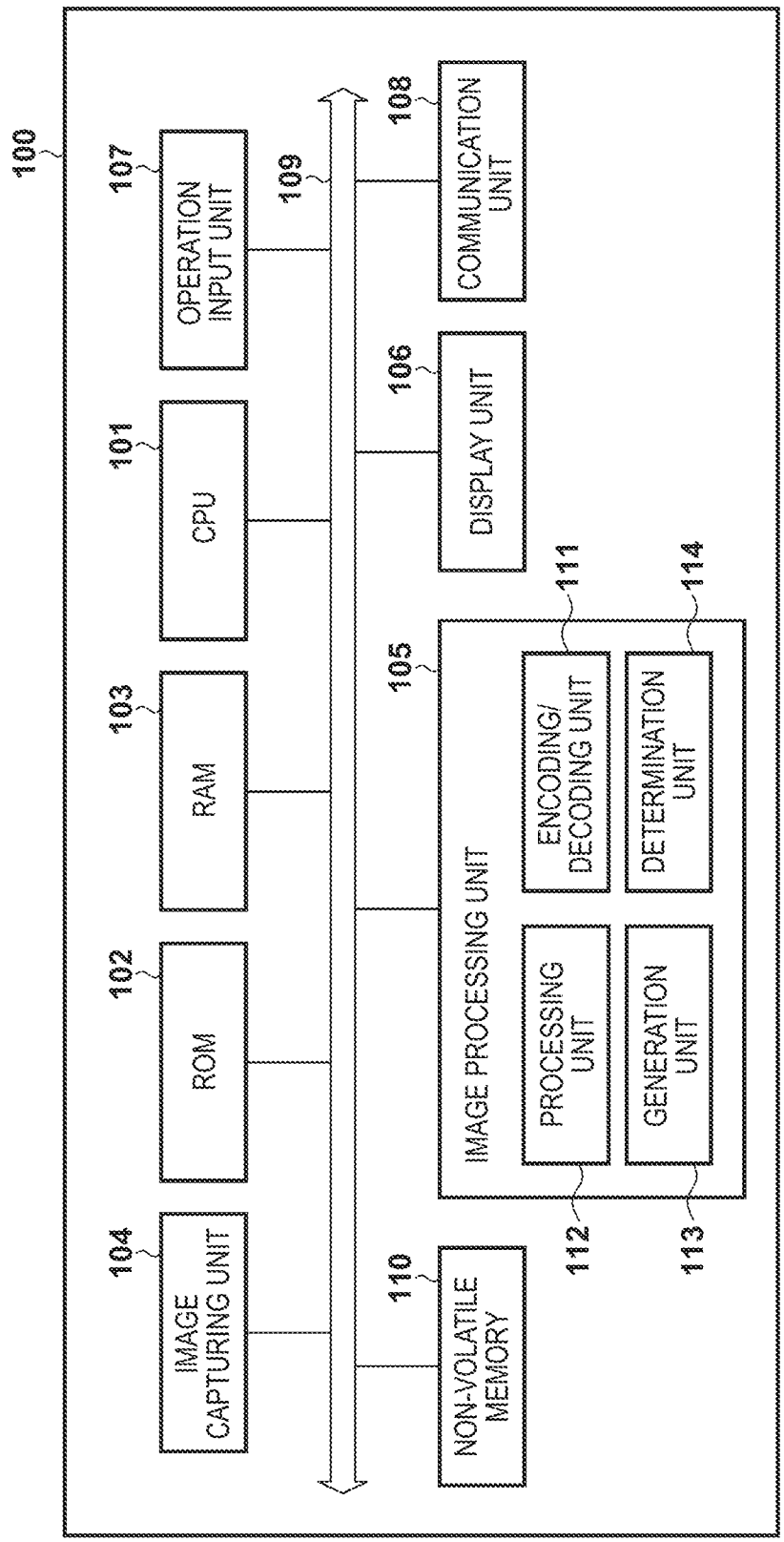
FIG. 1 is a block diagram illustrating an example of the hardware configuration of an image file generation apparatus 100.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of the hardware configuration of an image file generation apparatus 100 according to the present embodiment, which functions as an image processing apparatus, will be described first with reference to the block diagram in FIG. 1. A computer device such as a laptop/desktop personal computer (PC) equipped with a camera, a smartphone, a tablet terminal device, or the like can be applied as the image file generation apparatus 100.

An image capturing unit 104 includes an optical system such as lenses, an image sensor such as a CMOS sensor or a CCD, image processing circuitry that generates a captured image based on output signals from the image sensor, and the like. The image sensor photoelectrically converts an optical image formed on an image capturing surface of the image sensor through the optical system, and outputs an analog image signal corresponding to the optical image. The image processing circuitry includes circuits that perform noise removal, gain processing, demosaicing, and the like on the analog image signal, an A/D conversion circuit that A/D converts the analog image signal into a digital image signal, and the like. These circuits generate a digital image signal (a captured image (image data)) from the analog image signal, and output the generated captured image.

When the image capturing unit 104 captures a moving image, an image of each frame in the moving image is output from the image capturing unit 104 as a captured image, and when the image capturing unit 104 captures a still image periodically or non-periodically, that still image is output from the image capturing unit 104 as a captured image.

A ROM 102 stores configuration data of the image file generation apparatus 100, computer programs and data involved in the startup of the image file generation apparatus 100, computer programs and data involved in the basic operation of the image file generation apparatus 100, and the like.

A RAM 103 has an area for storing captured images obtained from the image capturing unit 104, and an area for storing computer programs and data loaded from the ROM 102, a non-volatile memory 110, and the like. The RAM 103 also has an area for storing data output from an image processing unit 105, and an area for storing data received from the exterior through a communication unit 108. The RAM 103 also has a work area used when a CPU 101, the image processing unit 105, or the like executes various types of processing. In this manner, the RAM 103 can provide various types of areas as appropriate.

The CPU 101 executes various types of processing using computer programs, data, and the like stored in the ROM 102, the RAM 103, and the like. Through this, the CPU 101 controls the overall operations of the image file generation apparatus 100, and executes or controls the various types of processing that will be described as processing performed by the image file generation apparatus 100.

An operation input unit 107 is a user interface such as a keyboard, a mouse, a touch panel, or the like, and can be operated by a user to input various types of instructions to the CPU 101.

The non-volatile memory 110 is a non-volatile storage device having a relatively large storage capacity (a large-capacity information storage device), such as an SD card, Compact Flash (registered trademark), a flash memory, or the like. An operating system (OS), computer programs and data for causing the CPU 101 to execute or control the various types of processing that will be described as processing performed by the image file generation apparatus 100, and the like are stored in the non-volatile memory 110. Image files generated by the image file generation apparatus 100, image files received from an external device through the communication unit 108, and the like, may be stored in the non-volatile memory 110.

The computer programs, data, and the like, stored in the non-volatile memory 110 are loaded into the RAM 103 as appropriate under the control of the CPU 101, and are then processed by the CPU 101.

The image processing unit 105 executes various types of image processing on the captured images. The image processing includes processing involved in developing, such as gamma conversion, color space conversion, white balance, exposure correction, and the like, for example. The image processing unit 105 may also be capable of executing analysis processing on captured images, compositing processing for compositing two or more captured images, and the like. To simplify the descriptions, the present embodiment will describe such image processing as being executed by a single piece of hardware, namely, the image processing unit 105, but some or all of this processing may be executed by different hardware.

An encoding/decoding unit 111 is a codec for moving images and generated images according to H.265 (HEVC), H.264 (AVC), H.266 (VVC), AV1, JPEG, and the like. The encoding/decoding unit 111 encodes and decodes still images, moving images, and the like handled by the image file generation apparatus 100.

A processing unit 112 obtains encoded data generated by the encoding/decoding unit 111 encoding a still image, a moving image, or the like, and generates an image file compliant with a predetermined file format (e.g., HEIF) using the encoded data. Specifically, the processing unit 112 executes analysis processing on the encoded data stored in an image file that includes a still image or an image sequence, generates information relating to the still image or image sequence, obtains parameter information relating to the encoded data, and the like. The processing unit 112 then uses this information to generate metadata, and stores the generated metadata in the image file along with the encoded data. Note that the processing unit 112 can generate an image file compliant with, for example, another moving image file format defined by MPEG, a format such as JPEG, or the like, as opposed to being limited to REIF. The encoded data included in the image file may be encoded data stored in advance in the RAM 103, the non-volatile memory 110, or the like, or may be encoded data received from an external device through the communication unit 108 and stored in the RAM 103, the non-volatile memory 110, or the like.

Additionally, the processing unit 112 analyzes the metadata stored in the image file and processes the metadata when playing back the still image or image sequence. The processing unit 112 also generates information for identifying a region of the image to be stored in the image file, generates metadata that associates region information with the image, and the like. The processing unit 112 also generates metadata relating to annotation information to be associated with the image, the region information, or the like. The processing unit 112 also performs analysis processing on the metadata when playing back the still image or image sequence.

A generation unit 113 generates identification information indicating that the file structure is capable of including privacy information that will be displayed in a UI, based on the metadata generated by the processing unit 112, in image file editing processing and playback processing. Here, "displayed in a UI" means being displayed in a user interface (UI). A result of structural analysis processing performed on the metadata by a determination unit 114 may be used when generating the identification information.

The determination unit 114 analyzes metadata configured by the processing unit 112, which is obtained as a storage target, and determines whether the structure is a structure configured to be capable of storing privacy information.

A display unit 106 is a display device, such as a liquid crystal display (LCD), a touchscreen, or the like, which is configured as part of the image file generation apparatus 100 or is provided so as to be detachable from the image file generation apparatus 100. The display unit 106 is used as a device for displaying previews, in which captured images captured by the image capturing unit 104 are displayed in real time, displaying information such as various types of settings/a graphical user interface (GUI), and the like. The display unit 106 is also used as a device for displaying images when playing back generated image files. In other words, the display unit 106 is a device that displays the results of processing/control by the CPU 101 as images, text, or the like. Note that the display unit 106 may be a projection device, such as a projector, the projects images, text, and the like.

If the display unit 106 is a touch panel, the operation input unit 107 may include a touch panel sensor. In this case, upon detecting an operation input made on the touch panel sensor, the operation input unit 107 outputs a control signal indicating the input to the CPU 101.

The communication unit 108 is an interface for communicating with external devices. The communication unit 108 may be a network interface that connects to a network and transmits and receives transmission frames, for example. In this case, the communication unit 108 may be, for example, PHY and MAC (transmission media control processing) capable of wired LAN connection using Ethernet (registered trademark). Alternatively, if the communication unit 108 is capable of connecting to a wireless LAN, the communication unit 108 may include a controller, RF circuitry, and an antenna that executes wireless LAN control such as IEEE 802.11a/b/g/n/ac/ax, or the like.

The image capturing unit 104, the ROM 102, the RAM 103, the CPU 101, the operation input unit 107, the non-volatile memory 110, the image processing unit 105, the display unit 106, and the communication unit 108 are all connected to a system bus 109.

Although the present embodiment describes the functional units illustrated in FIG. 1 as being implemented by hardware including circuitry, a processor, and the like, the configuration is not limited thereto. For example, some of the functional units illustrated in FIG. 1 (e.g., the image processing unit 105) may be implemented as software (a computer program). In this case, the computer program is stored in the non-volatile memory 110, loaded into the RAM 103 as necessary, and processed by the CPU 101.

Additionally, some of the functional units illustrated in FIG. 1 may be combined into a single functional unit and implemented by hardware or software, or a single functional unit may be divided into different functional units according to function and implemented by hardware or software.

Additionally, although FIG. 1 illustrates the image file generation apparatus 100 as including the image capturing unit 104, the image capturing unit 104 may be an external device. For example, the image capturing unit 104 and the image file generation apparatus 100 may be connected over a wired/wireless network, and the image file generation apparatus 100 may obtain captured images generated by the image capturing unit 104 over the network.

The generation of an image file by the image file generation apparatus 100 will be described next. As described above, an image file generated by the image file generation apparatus 100 can store a plurality of captured images, and is configured so as to include information associated therewith. The following will describe a form in which HEIF is used as the file format of the image file, and the functional units of the image file generation apparatus 100 derive the necessary information and configure the associated metadata so as to generate an image file compliant therewith (an HEIF file). However, the configuration is not limited thereto, and the file format used for the generated image file may be another moving image file format defined by MPEG, a format such as JPEG, or the like, for example.

Figure 2:
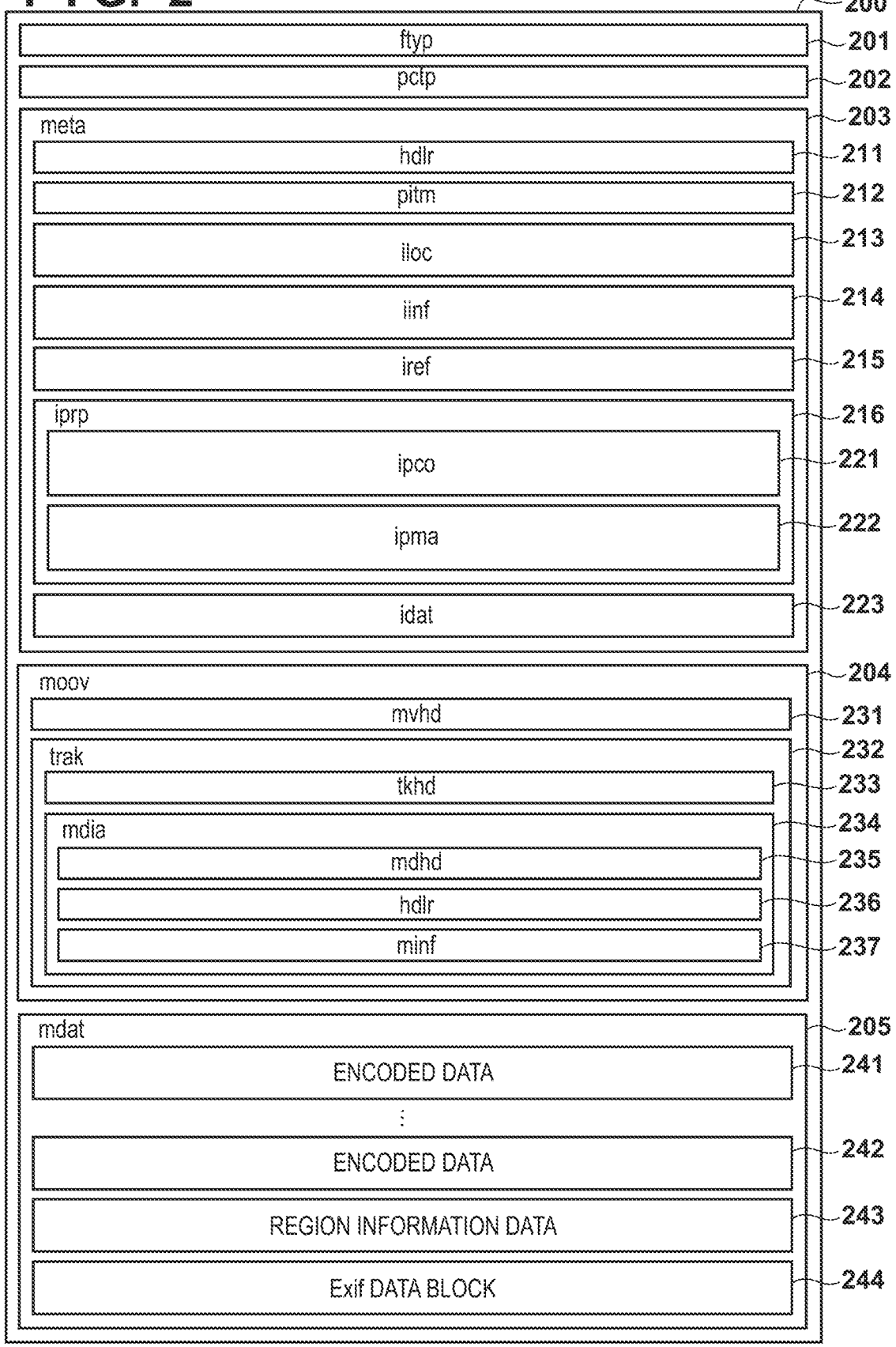
FIG. 2 is a diagram illustrating an example of the structure of a High Efficiency Image File format (HEIF) file.

The file structure of an HEIF file will be described first with reference to FIG. 2. As illustrated in FIG. 2, an HEIF file 200 generally has the following five boxes (storage regions).

The first box (storage region) is a FileTypeBox ('ftyp' box) 201. The 'ftyp' box 201 stores a brand name by which a reader of the HEIF file 200 identifies the specifications of the HEIF file 200.

The second box (storage region) is a PrivacyConsiderationTypeBox ('pctp' box) 202. The 'pctp' box 202 is a box that makes it possible to identify, for each structure type, whether the metadata structure of the HEIF file 200 is a structure in which privacy information can be stored in images and metadata that are not to be displayed at a first priority. The configuration of the 'pctp' box 202 will be described in detail later.

The third box (storage region) is a MetaBox ('meta' box) 203. As illustrated in FIG. 2, the 'meta' box 203 stores a plurality of types of information relating to the captured image, each separated into different boxes.

The fourth box (storage region) is a MovieBox ('moov' box) 204. The 'moov' box 204 stores metadata for describing various types of information relating to presentation, such as moving images and audio stored in the HEIF file 200. Note that, if the stored data is an image sequence, the metadata is stored using a system for describing various types of information relating to a moving image, but unlike moving images, limited-time information is optional information. Additionally, when a sequence having moving images, audio, or the like is not included in the HEIF file 200, the MovieBox ('moov' box) 204 is not stored in the HEIF file 200.

The fifth box (storage region) is a MediaDataBox ('mdat' box) 205. The 'mdat' box 205 stores encoded data (image data) 241 to 242 as an encoded bitstream. Region information data 243 indicating a region within the image is also stored in the 'mdat' box 205. Furthermore, an Exif data block 244 that stores information such as when the image was captured by the image capturing unit 104 is stored in the 'mdat' box 205. The present embodiment will describe a form in which the 'mdat' box 205 is used as a region for storing the encoded data 241 to 242, the region information data 243, and the Exif data block 244. However, a box structure such as that of an 'idat' box, an 'imda' box, or the like, for example, may be used for the region. Note that, in the following descriptions, the encoded data 241 to 242 stored in the 'mdat' box 205 will be referred to as "image data" or "encoded data" with different wording as appropriate.

A HandlerReferenceBox Oldie box) 211 stores a declaration of a handler type for analyzing the structure of the 'meta' box 203. In the HEIF file 200 generated by the image file generation apparatus 100 according to the present embodiment, metadata describing untimed data stored in the 'meta' box 203 is for still images. Accordingly, a handler type name 'pict' for identifying a still image as the target is assumed to be set in the 'hdlr' box 211.

A PrimaryItemBox ('pitm' box) 212 specifies an identifier (item_ID) of the encoded data serving as a representative item among the image items stored in the HEIF file 200. An image item specified as an item having a first priority is played back and displayed as an image that is normally to be displayed.

An ItemLocationBox ('iloc' box) 213 stores information indicating a storage location of each information item, including the image item, in the HEIF file 200. The 'iloc' box 213 typically describes the storage location of the image item as a byte offset from the beginning of the HEIF file 200 and a data length from that beginning. In other words, the positions of the encoded data 241 to 242, the region information data 243, and the Exif data block 244 stored in the 'mdat' box 205 can be specified by the information in the 'iloc' box 213.

An ItemInfoBox ('iinf' box) 214 defines basic information (item information) for all items in the HEIF file 200, such as the item_ID, an item type indicating the type of the item, and the like. In addition to image items such as encoded image items and derived image items, region items indicating regions within an image, Exif information items indicating Exif data blocks, and the like, are specified in the item information.

An ItemReferenceBox (ire box) 215 stores information describing associations among items in the HEIF file 200. The 'iref' box 215 is used to describe associations between an image item and capturing information (Exif data and the like) items thereof, in a situation where the image item is a captured image. In a situation where a plurality of image items are in a derived image relationship, the box is used to describe the associations among the image items. In a form in which a region within an image item is indicated, the box is used to describe the association between the image item and the region item. The association of each item specifies an item reference type, which makes it possible to identify the type of item reference. In addition, the reference relationships among the items are described by describing the item IDs, specified in the iinf box, in the from_item_ID and to_item_ID.

An ItemPropertiesBox ('iprp' box) 216 stores various types of attribute information (item properties) about the information items included in the HEIF file 200. More specifically, the 'iprp' box 216 includes an ItemPropertyContainerBox ('ipco' box) 221 that describes the attribute information, and an ItemPropertyAssociationBox ('ipma' box) 222 that indicates the association between the attribute information and each item.

The 'ipco' box 221 stores attribute information such as, for example, entry data indicating an HEVC parameter set required to decode the HEVC image item, entry data indicating the width and height of the image item in pixels, and the like. It may also be possible to specify attribute information that can specify any text information as an item property.

The AccessibilityTextProperty ('altt') indicated in FIG. 7 is an example of attribute information that can store desired text information. The AccessibilityTextProperty indicated in FIG. 7 contains the four-character code 'altt' indicated in definition 701, and this four-character code is used to identify the AccessibilityTextProperty. The altt property includes alt text 702, which, like HTML alternative text, contains a character string suitable for use as alternative text for images when images cannot be displayed. The altt property further contains alt_lang 703, in which the language used for the alternative text is represented by a language tag character string compliant with IETF RFC5646. If a plurality of altt properties are associated with the same item, they represent choices specified in different languages, and the reader can select the appropriate choice. A maximum of one property with the same alt_lang value can be associated with the same item.

Similarly, UserDescriptionProperty ('udes') indicated in FIG. 8 is an example of attribute information that can store desired text information. The UserDescriptionProperty indicated in FIG. 8 contains the four-character code 'udes' indicated by definition 801, and this four-character code is used to identify the UserDescriptionProperty. The udes property contains user-defined name information (name) 803, annotation description information (description) 804, and tag information (tags) 805, and can be associated with an item or an entity group. The udes property further contains name information (lang) 802, in which the language used for the udes property is represented by a language tag character string compliant with IETF RFC5646. If a plurality of udes properties are associated with the same item or entity group, they represent choices specified in different languages, and the reader can select the appropriate choice. Here, the name information 803 is information that indicates the name of the item or entity group with which the udes property is associated, in a format that can be read by a human. The annotation description information 804 is information indicating a description of the item or entity group with which the udes property is associated, or a sentence that is presented as an annotation, in a format that can be read by a human. The tag information 805 is information indicating user-defined or automatically assigned tags associated with the item or entity group with which the udes property is associated, and is configured to be capable of including a plurality of tags, separated by commas, for example.

The item properties indicated in FIGS. 7 and 8 can contain any text information, and thus the metadata can contain privacy information depending on the descriptions therein. This means that properties containing such desired text information can may be included in the HEIF file, and descriptions that include privacy information may therefore be included in the item properties. In addition, the item properties are not data normally intended for display. As such, even if such item properties are included in an HEIF file, those properties may be included as data that may be transferred or published on the web, or the like, without being aware that such descriptions are included.

It is also possible to specify a TransfomativeProperty, which is intended to transform and to display images when outputting images, as attribute information that can be specified as an item property. This may involve storing, for example, data indicating rotation information for rotating an image for display, data indicating cropping information for cropping an image for display, and the like.

Returning to FIG. 2, using the ID of the information item (the item ID), the 'ipma' box 222 stores, for each item, entry data indicating the association with the attribute information stored in the 'ipco' box 221. Note that, if there is no attribute information associated with an item, such as an Exif data block information item, entry data indicating the association is not stored.

An ItemDataBox ('idat' box) 223 stores data relating to the items contained in the HEIF file 200. The 'idat' box 223 stores a data structure for describing a derived image item, for example. An example of the data structure of a derived image item that can be stored in the 'idat' box 223 will be described here with reference to FIGS. 9 and 10.

The data structure illustrated in FIG. 9 is a data structure for describing a grid derived image. An item having an item type of 'grid', indicated by the iinf box, defines a derived image item in which a reconstructed image is constituted by at least one input image in a predetermined grid order. The input image for the derived image item is specified by an item reference of a dimg reference type using the iref box, and the image item ID specified in to_item_ID constitutes the derived image as the input image. All input images have the same width and height. Grid derived image item data includes data size information 901 indicating the size (Field-Length) of the parameters handled by the data structure, as illustrated in FIG. 9. In the present embodiment, the size handled in the grid derived image data structure is configured to be switchable between 16-bit and 32-bit, and is determined to be one of those data sizes based on a value in flags. The grid derived image item data also includes row_minus_one 902, which indicates the number of rows of input images for the derived image, and columns_minus_one 903, which indicates the number of input images in a single row (a number of columns). A value one less than the number of rows or the number of columns is specified for the value in row_minus_one 902 or columns_minus_one 903. It is necessary for the number of image item IDs specified in to_item_ID, which is described as an item reference, to match the number in rowxcolumns. The input images are input in the order in which the item references are specified in the iref box, first from left to right in the uppermost row, then from left to right in the second row, and so on. Furthermore, the grid derived image item data includes output_width 904 and output_height 905, which indicate the width and height of the image to be output as a grid derived image, respectively. If a width xcolumns of the input image is at least the output_width and a height xrows of the input image is at least the output_height, the right and bottom images among all the images constituting the grid are trimmed to output_width and output_height, after which the image is output. In this manner, a grid derived image may not display all the pixel information of the input images thereof, even if the item ID is specified in pitm as the first priority image (the image displayed with the highest priority). In other words, the image is output having been trimmed according to the output_width and output_height, and thus parts of the right and bottom images are not output, depending on the configuration method. Even if privacy information appears in the right and bottom parts of the image, which are not output, the user would not easily notice this because those parts are not normally displayed. In other words, even if privacy information is included within an image part, that information may be included as data that could be forwarded, published on the web, or the like, without being recognized as such.

The data structure illustrated in FIG. 10 is a data structure used to describe an overlay derived image. An item of item type 'iovl' indicated in the iinf box defines a derived image item configured by overlaying one or more input images in a specified layer order in a larger canvas. The input image for the derived image item is specified by an item reference of a dimg reference type using the iref box, and the image item ID specified in to_item_ID constitutes the derived image as the input image. The first image specified in the item reference as an input image is output in the lowermost layer, and the last image specified is output in the uppermost layer. The overlay derived image data includes canvas_fill_value 1001, which indicates a per-channel pixel value to be used when a pixel in the input image is not at a specific pixel position, as indicated in FIG. 10. A fill value is specified by an RGB value and A, which indicates a transparency. The overlay derived image data also includes data size information 1002 that indicates the size (FieldLength) of the parameters handled by the overlay derived image data structure. In the present embodiment, the size handled in the overlay derived image data structure is configured to be switchable between 16-bit and 32-bit, and is determined to be one of those data sizes based on a value in flags. The overlay derived image data also includes output_width 1003 and output_height 1004, which indicate the width and height sizes, respectively, of the image serving as the canvas to be output as the overlay derived image. The overlay derived image data also includes horizontal offset 1005 and vertical offset 1006, which specify offsets at which the input image is disposed from the upper-left corner of the canvas. Due to the offset of the input image and the size of the input image, image parts located at pixel positions outside the canvas size are not included in the reconstructed overlay derived image. As such, the overlay derived image may not take all the pixel information of the input image as information to be displayed, even if the item ID is specified in pitm as the first priority image. In other words, an image part at a pixel position outside the canvas size specified by output_width and output_height is not included in the derived image, and part of the image may therefore not be output, depending on the configuration method thereof. Additionally, some pixels of the input image that are overlaid and displayed by another input image during overlaid display are not used for output. Even if privacy information appears in an image part that is not output, the user would not easily notice this because those parts are not normally displayed. In other words, even if privacy information is included within an image part, that information may be included as data that could be forwarded, published on the web, or the like without being recognized as such.

Returning to FIG. 2, a MovieHeaderBox ('mvhd' box) 231 stores overall information related to the entire presentation included in the HEIF file 200, independent of the media in the moov box.

A TrackBox ('trak' box) 232 is a container box for a single track of the presentation included in the HEIF file 200. The presentation is constituted by one or more tracks, and each track has unique temporal and spatial information.

A TrackHeaderBox ('tkhd' box) 233 is a box that is stored for each track, and that stores a track ID that identifies the track, track characteristic information, and the like.

Information relating to media data in a related MediaBox ('mdia' box) 234, MediaHeaderBox ('mdhd' box) 235, HandlerReferenceBox ('hdlr' box) 236, and MediaInformationBox ('minf' box) 237 is stored in each track. The HandlerReferenceBox ('hdlr') 236 stores a declaration of a handler type for analyzing the structure of the Media box. The handler type is specified as 'vide' for moving images, 'soun' for audio, and 'pict' for image sequences.

FIGS. 11A and 11B illustrate definitions of the data structure of the region information data (RegionItem) 243 stored in the 'mdat' box 205. In the following descriptions, the region information data 243 stored in the 'mdat' box 205 will be referred to as "region item" or "Region item" with different wording as appropriate. An item with an item type of 'rgan', indicated in the iinf box, defines a region item intended to identify a region in the image. The region information data is associated with the encoded data using the iref box to specify an item reference of the cdsc reference type, which defines a region in the image. As illustrated in FIGS. 11A and 11B, one piece of the region information data 243 includes data size information 1101, which indicates the size (field size) of the parameters handled by the data structure. In the present embodiment, the size handled in the data structure within the region information data 243 is configured to be switchable between 16-bit and 32-bit, and is determined to be one of those data sizes based on a value in flags.

In addition, the region information data 243 includes space size information 1102, which indicates the two-dimensional size of a reference space for defining the region relating to the region information data 243. Considering that an HEIF file can store image data of a plurality of types of image sizes and that the image sizes can be changed through editing, it is not efficient to store the region information data 243 for each of the image sizes of the stored image data. Accordingly, in the present embodiment, a region definition that does not depend on the image size of the image data is made in a relative manner by introducing a reference space in which the image data size corresponding to the region information data 243 is allocated to the entire image and setting various types of information about the region for that reference space. For example, when the reference space is 1024×512 pixels, the region specified for image data of the same image size is set in the image data using values equal to the position, width, and height indicated in region shape information 1104 (described later). On the other hand, the region identified for image data of 2048×1024 pixels is set in the image data using values obtained by doubling the position, width, and height indicated in the region shape information 1104 (described later). In other words, the region information data 243 defines the region as a relative position and shape in the overall image data, and the space size information 1102 defines the two-dimensional size of the reference space assigned to the entire image. As illustrated in FIGS. 11A and 11B, the space size information 1102 includes reference_width, which indicates the width of the reference space, and reference_height, which indicates the height of the reference space.

The region information data 243 also includes region number information 1103, which indicates the number of regions defined by the region information data 243 (region count), and the region shape information 1104, which indicates the shape of the region (geometry_type) for each of the defined regions. The region information data 243 according to the present embodiment is configured such that point, rectangle, ellipse, polygon, polyline, referenced mask, and inline mask can be selected as the shape of the region, and the shape is specified by the value of geometry_type. Although the present embodiment describes seven types of two-dimensional shapes as being selectable as regions, the configuration is not limited thereto. It can be easily understood that, for example, a line, a triangle, a free curve, a three-dimensional shape, or the like, may be used for the region shape information 1104, as long as any desired space in the image data can be specified. Here, the region shape information 1104 describes the specific parameters for specifying a region differently depending on the shape.

If the shape is a point (geometry_type is 0), the region is specified by position information (x,y) 1105 indicating the coordinates of the point in the reference space.

If the shape is a rectangle (geometry_type is 1), the region is specified by position information (x,y) 1106 indicating the coordinates of the upper-left point of the rectangle in the reference space (a reference point) and shape definition information 1107 indicating the width and height of the rectangle.

If the shape is an ellipse (geometry_type is 2), the region is specified by position information (x,y) 1108 indicating the coordinates of the center of the ellipse in the reference space, and shape definition information 1109 indicating the lengths of the radius in the x-axis direction (radius_x) and the radius in the y-axis direction (radius_y) of the ellipse.

If the shape is a polygon (geometry_type is 3) and a polyline (geometry_type is 6), the region is specified by vertex number information 1110 indicating the number of vertices of the polygon in the reference space, and position information (px,py) 1111 indicating the coordinates of each vertex.

If the shape is a referenced mask (geometry_type is 4), another item defined as a mask image item is associated with the encoded image data using the reference type mask in the iref box. The region is then specified by position information (x,y) 1112 indicating the coordinates of the upper-left point of the rectangle in the reference space (a reference point), and shape definition information 1113 indicating the width and height of the referenced mask. Note that when zero is specified for width and height, the size information is assumed to be associated with the referenced mask image item as an item property.

If the shape is an inline mask (geometry_type is five), the part of the image data corresponding to a pixel having a value of 1 in the mask image stored in data 1118 indicates the region. The region is then specified by position information (x,y) 1114 indicating the coordinates of the upper-left point of the rectangle in the reference space (a reference point), and shape definition information 1115 indicating the width and height of the referenced mask.

In addition, the region information data 243 includes mask_coding_method 1116, which indicates the coding method applied to the mask included in the data. A value of zero for mask_coding_method 1116 indicates that no coding is applied to the mask, and a value of one for mask_coding_method 1116 indicates that deflate compression, defined in RFC 1951, is applied. Other values are reserved and are undefined.

Here, mask_coding_parameters 1117 indicates additional encoding parameters required to correctly process the coded mask data. If the value of mask_coding_method 1116 is 1, mask_coding_parameters 1117 indicates the number of bytes of the coded mask array data. The value of mask_coding_parameters is reserved if the value of mask_coding_method is greater than one.

The data 1118 contains a coded or uncompressed representation of the mask, including pixels of the inline mask, in raster scan order. Each pixel is represented by one bit, and eight pixels are packed into one byte. The byte packing is performed in big-endian order. If the mask width is not a multiple of eight pixels, no padding is added at the end of each line. Only the last data byte is padded with bits set to one.

Next, FIG. 6 illustrates the definition of the data structure of the PrivacyConsiderationTypeBox ('pctp' box) 202, which is stored at the file level of the HEIF file 200.

As indicated by definition 601, PrivacyConsiderationTypeBox is a box that contains a box type of 'pctp' and can be identified by the four-character code 'pctp'.

entry_count in definition 602 contains a value indicating the number of types of images that are not to be displayed in the first priority (non-highest priority images) from the metadata structure in the HEIF file 200, and the types of structures that can store privacy information in the metadata. If the structure is not capable of storing any type of privacy information, zero may be defined for entry_count. This makes it possible to indicate that the file has already been determined to have a structure in which privacy information can be included.

privacy_consideration type in definition 603 is type information indicating the type of structure that can store privacy information.

Definition 604 indicates that the data is a structure that can store privacy information but has already been determined not to contain privacy information.

Definition 603 and definition 604 contain identification information corresponding to the number indicated by entry_ count in definition 602. A value indicating the type of the structure is stored in privacy_consideration type in definition 603.

For example, a type of one indicates that a grid derived image item is specified for pitm, which is the first priority image, and that there are right and bottom image parts that are not to be output. In other words, this parameter indicates that the input image includes a part that is trimmed and not displayed. Note that even if a grid derived image is specified in pitm, the image does not correspond to this type if part of the input image is not trimmed when outputting the derived image. In other words, this is a case when the width xcolumns of the input image matches the output_width, and the height xrows of the input image matches the output_height.

A type of two indicates a configuration in which an overlay derived image is specified in pitm, which is the first priority image, and that there is a part of the input image that is not to be output due to being disposed outside the canvas and being overlaid by another input image.

A type of three indicates a structure in which a crop conversion item property is applied to the image item specified as the first priority image. This indicates that the image part which is not to be displayed due to the crop conversion item property being applied is included in the image item specified in pitm.

A type of four indicates that the file structure contains another image item that is not related to the image item specified in pitm, or another image item that is related but does not affect the output display. For example, an image does not correspond to this type even if a thumbnail image item of the first priority image, an image item serving as an input image when the first priority image is a derived image, or the like, is included. On the other hand, if the first priority image and other image items are stored as the same group as an entity group, such as an image collection or slideshow, the output display for the first priority display is not affected. Accordingly, the file structure is identified as being of a type in which this type of privacy information can be included.

A type of five indicates that the file structure includes an image sequence within the HEIF file. This is assumed to be a case in which the sequence of images in the moov box is stored separately from the still image that is the first priority image. For example, even if one image in an image sequence is specified as the first priority image, another image in the sequence may contain privacy information. This also includes cases in which an image sequence unrelated to the still image is included. There are cases when this type can also be identified by brand definitions, file extensions, and the like which have already been defined.

A type of six indicates that item properties capable of describing any desired text information are included. This is a case when the above-described AccessibilityTextProperty and UserDescriptionProperty are included. Such a property corresponds to this case when the file contains such a property, regardless of whether the file is associated with a first priority image.

A type of seven indicates a type in which the region item is associated with the first priority image. A region item associated with the first priority image may be set to be displayed depending on the device that displays the item, but it is not absolutely necessary for the item to be displayed, and thus the response differs depending on the device. Furthermore, a referenced mask or inline mask being specified as the region item indicates that part of the first priority image may not be displayed due to the mask.

A type of eight indicates that a type in which a region item specifying a part outside the image region is associated with the first priority image. In such a case, it is possible that the region item will not be displayed even if the device is a device that displays region items, for example. Such a file metadata structure is assumed to be identifiable.

A type of nine indicates a type in which the Exif data block is included in the file. This is particularly assumed to be a case where GPS information is included in the Exif data block, but other Exif data block information may be assumed as well.

A type of ten indicates that the type information indicates that the structure is an HEIF file data structure that can include other privacy information. Type 11 is reserved.

In this manner, when data that is not normally displayed is included in the HEIF file as a data structure that can include privacy information, that data is stored as information that can be easily identified by the user, the playback device, or the like. This is identification information that is stored based on whether the file structure is capable of storing such data, regardless of whether the HEIF file actually includes privacy information. Furthermore, even if the structure is such a data structure, if the user has already determined that the data structure does not contain privacy information, the identification information no_privacy_flag 604, indicating that the structure has already been determined not to include privacy information, is stored. This makes it possible to handle the file as a file that does not require care with respect to privacy information, even if the data structure is capable of containing privacy information. Note that this box structure is an example, and additionally, other forms may be used for the types.

An example of an output file (an image file) output by the image file generation apparatus 100 according to the present embodiment will be described here with reference to FIGS. 5A and 5B. Note that the present embodiment assumes that the image file is configured such that data including types in which four types of privacy information can be stored is stored in the file as the file data structure.

As indicated by a description 505 corresponding to the 'mdat' box 205, FIGS. 5A and 5B illustrate an example of an image file that stores the HEVC encoded data (HEVC Image Data and HEVC Image Sequence Data) 241 to 242, the region information data (Region item Data) 243, and the Exif Data Block (Exif Data Block)244. As indicated by a description 523, the region information data 243 is compliant with the definitions illustrated in FIGS. 11A and 11B, and specifies a rectangular region for the reference space having an image size of 4032 pixels×3024 pixels. Coordinates (x0,y0) of the reference point in the reference space of the region and the image size (w0×h0) are also specified for the region specified by the stated description.

A description 501 corresponds to the 'ftyp' box 201, where 'mif1' is stored as the type value major-brand for a brand definition compliant with the HEIF file, and 'heic' is stored as the type value compatible-brands for a brand definition that is compatible.

A description 502 corresponds to the 'pctp' box 202, and makes it possible to identify whether the structure is capable of storing privacy information from the data and metadata stored in the HEIF file. This example of the output file indicates that four types of privacy information can be stored in the structure (entry_count is 4), and corresponding pieces of type of information are stored in descriptions 511 to 514, respectively.

A description 511 indicates that the HEIF file output by the image file generation apparatus 100 according to the present embodiment specifies a grid image as the item in pitm, and that the structure includes a grid derived image output with the right and bottom parts of the grid trimmed. Furthermore, in the description 511, no_privacy_flag is set to one as information indicating that the data structure indicated by this type (the part of the grid image that is not output) has already been determined not to include privacy information.

A description 512 indicates that the HEIF file output by the image file generation apparatus 100 according to the present embodiment has a data structure including an image sequence. Like the description 511, no_privacy_flag is set to one as information indicating that the data structure indicated by this type (image sequence) has already been determined not to include privacy information.

A description 513 indicates that the HEIF file output by the image file generation apparatus 100 according to the present embodiment has a data structure including an item property that contains desired text information. Furthermore, in the description 513, no_privacy_flag is set to zero, which indicates that the data structure (the item property containing desired text) may include privacy information.

A description 514 indicates that the HEIF file output by the image file generation apparatus 100 according to the present embodiment has a data structure including an Exif data block. Furthermore, in the description 514, no_privacy_flag is set to 1 as information indicating that the data structure indicated by this type (Exif data block) has already been determined not to include privacy information.

Next, various types of information on metadata describing untimed data stored in this example of the output file is indicated in a description 503 corresponding to the 'meta' box 203.

A description 515 corresponds to the 'hdlr' box 211, and the handler type of the specified MetaDataBox (meta) is 'pict'.

A description 516 corresponds to the 'pitm' box 212, where 25 is stored as the item_ID and the ID of the image to be displayed as the first priority image is specified.

The description 517 corresponds to the 'iinf' box 214, and indicates the item information (the item ID (item_ID) and the item type (item_type)) for each of the items. Each item can be identified by the item_ID, and this indicates what type of item is identified by the item_ID. In the example in FIGS. 5A and 5B, 28 items are stored, and thus entry_count is 28; 28 types of information are arranged in the description 517, and an item ID and item type are specified for each. In the image file illustrated in the drawing, first to 24th pieces of information correspond to HEVC encoded image items of a type hvc1. A 25th piece of information is a grid derived image item of an item type grid. A 26th piece of information is an HEVC encoded image item of item type hvc1, serving as a thumbnail image, a 27th piece of information is a region item of an item type rgan, which indicates the region; and a 28th piece of information is a metadata item of an item type Exif, which indicates the Exif data block. Accordingly, as indicated by the description 514, the HEIF file output by the image file generation apparatus 100 according to the present embodiment has a data structure including an Exif data block.

A description 518 corresponds to the 'iloc' box 213, and information on the storage location and data size of each item in the HEIF file is specified. For example, an encoded image item having an item_ID of 1 has an offset of 01 and a size of L1 bytes in the file, and the location of the data in the mdatBox is specified.

A description 519 corresponds to the 'iloc' box 215, and indicates a reference relationship (association) with each item. An item reference indicated by a description 531 is specified as dimg, which indicates that the reference type is a derived image. This also indicates that the HEVC encoded image items having item_IDs of 1 to 24 specified in the to_item_ID are referenced from the grid derived image item having an item_ID of 25 specified in the from_item_ID. Through this, the encoded image items having item_IDs of 1 to 24 are specified as the input images for the derived image item. Additionally, thmb, which indicates a thumbnail relationship for the reference type, is specified for the item reference indicated by a description 532. This indicates that the grid derived image item having an item_ID of 25, specified in to_item_ID, is referenced from the HEVC encoded image item having an item_ID of 26 specified in from_item_ID. This indicates that the HEVC encoded image item having an item_ID of 26 is a thumbnail image of the grid derived image item having an item_ID of 25. Here, cdsc, which indicates a content description relationship, is specified as the reference type in item references indicated by a description 533 and a description 534. The description 533 indicates that the grid derived image item having an item_ID of 25, specified in to_item_ID, is referenced from the region information item having an item_ID of 27, specified in from_item_ID. Through this, the region information item having an item_ID of 27 indicates a partial region within the grid derived image item having an item_ID of 25. The description 534 indicates that the grid derived image item having an item_ID of 25, specified in to_item_ID, is referenced from the Exif data block item having an item_ID of 28, specified in from_item_ID. Through this, the Exif data block item having an item_ID of 28 indicates that information from when the grid derived image item having an item_ID of 25 was captured is described.

A description 520 corresponds to the 'idat' box 223, and the data structure of the grid derived image item having an item_ID of 25 is specified. In the HEIF file according to the present embodiment, 3 and 5 are specified for rows-minus_one and columuns_minus_one, respectively, in the grid derived image. This indicates that the grid derived image is constituted by 4×6 input images. Note that the item number of 24 specified as the number of input images for the item reference indicated by a description 531 and the number of grids, which is 4×6 (24), have matching values. The number of pieces is also specified as 4032 and 3024 for output_width and output_height, respectively, and the image is therefore constituted by 4032 pixels in width and 3024 pixels in height.

A description 521 corresponds to the 'iprp' box 216, and includes a description 535 corresponding to the 'ipco' box 221 and a description 536 corresponding to the 'ipma' box 222. A description 535 lists the attribute information that can be used for each item as entry data. As illustrated in the drawing, description 535 includes first and second entries indicating encoding parameters and third, fourth, and fifth entries indicating the display pixel size of the item, as well as a sixth entry indicating annotation description information. The annotation description information has lang set to Japanese (JP), "contact telephone number" set to name, "090-1234-5678" set to description, and "personal information" is set in tags. In this manner, privacy information may be included in the item property containing desired text in the identification information of the description 513, and thus the file is actually output as a file containing privacy information. The attribute information listed in the description 535 is associated with each item stored in the HEIF file in the entry data in the description 536 corresponding to the 'ipma' box 222. In the example in FIGS. 5A and 5B, image items having item_IDs of 1 to 24 are associated with a common 'ispe' (property_index of 4), indicating that those image items are images of the same image size, namely 1024 pixels×1024 pixels. Similarly, image items having item_IDs of 1 to 24 are associated with a common 'hvcC' (property_index of 1), indicating that the image items have the same encoding parameters. On the other hand, items having item_ID of 25 to 27 have mutually different item properties associated therewith. The 'ispe' (property_index of 3) is associated with the derived image item having item_ID of 25, indicating that the image size is 4032 pixels×3024 pixels. As mentioned with respect to the data structure of the grid derived image in description 520, if the input image is applied to the rows and columns of the grid derived image in this example output file, the image size will be have a width of 6×1024 wide and a height of 4×1024, meaning that the derived image size, which is 4032×3024 pixels, is smaller, and the bottom and right partial images are therefore trimmed after the input images are arranged in the grid. Accordingly, the description 511 indicates that the part to be trimmed is not normally a part to be displayed, and that the data structure may have an image containing privacy information in this part. The image item having an item_ID of 26 is associated with 'ispe' (property_index of five), indicating that the image size is 768 pixels×576 pixels. Similarly, the image item having an item_ID of 26 is associated with 'hvcC' (property_index of two), indicating the encoding parameters. The region information item having an item_ID of 27 is associated with 'udes' (property_index of 6), indicating annotation information for the region. In this manner, the association of the 'udes' property realizes the assignment of annotation information to a region. Note that none of the item properties are associated with the Exif data block item having an item_ID of 28. Corresponding entry information is therefore not stored.

A description 504 corresponds to the 'moov' box 204, and specifies various types of information about the presentation. A description 522 corresponds to the 'hdlr' box 236, and specifies 'pict' as the handler type declaration for analyzing the structure of the Media box. This indicates that an image sequence is stored for the various types of information about the presentation and the corresponding encoded data below the moov box and the track box specified in the description 504. Therefore, as indicated by the description 512, all images included in the image sequence are not normally displayed, which indicates that the data structure may include an image containing privacy information in the images which are not to be displayed.

The present embodiment describes a configuration in which the definitions in FIG. 6 indicate information identifying a data structure that can include privacy information. However, the configuration of the identification information is not limited thereto, nor is the manner in which information is included in metadata limited to that illustrated in FIGS. 5A and 5B.

Figure 3:
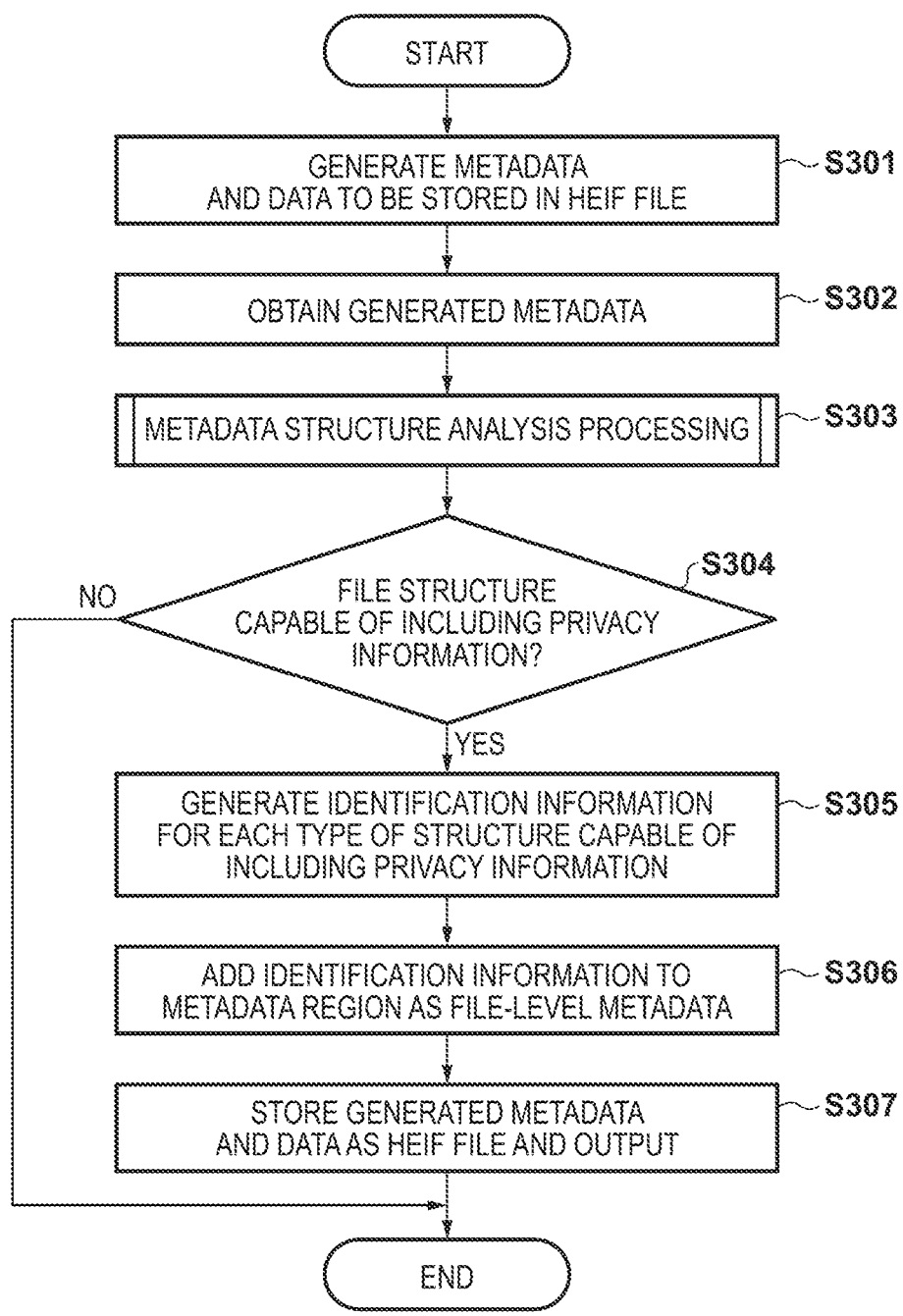
FIG. 3 is a flowchart illustrating image file generation processing.

Generation processing performed by the image file generation apparatus 100 to generate an HEIF file having the file structure capable of storing privacy information will be described next with reference to the flowchart in FIG. 3. Note that the generation processing illustrated in the flowchart in FIG. 3 will be described, for example, as being started when the CPU 101 detects that the user has operated the operation input unit 107 and made an operation input involved in actually capturing an image. However, the trigger for starting the generation processing illustrated in the flowchart in FIG. 3 is not limited to a specific type of trigger.

In step S301, the CPU 101 controls the image capturing unit 104 and the image processing unit 105 to obtain a series of image data to be stored in an HEIF file. Note that the CPU 101 may obtain a group of images stored in the non-volatile memory 110 in advance as the series of image data to be stored in the HEIF file. Additionally, the CPU 101 may obtain a group of images received from an external device through the communication unit 108 as the series of image data to be stored in the HEIF file. The CPU 101 also controls the image processing unit 105 to cause the processing unit 112 to generate metadata to be stored in the HEIF file along with the image data.

In step S302, the processing unit 112 obtains the generated metadata. Then, in step S303, the determination unit 114 performs analysis processing on the metadata structure of the metadata obtained by the processing unit 112. The analysis processing performed in step S302 will be described in detail with reference to the flowchart in FIGS. 4A-4C.

In step S401, the determination unit 114 determines whether a primary image item specified in the pitm box of the metadata to be stored in the HEIF file is a derived image.

If the result of this determination indicates that the primary image item is a derived image, the sequence moves to step S402, whereas if the primary image item is not a derived image, the sequence moves to step S409.

In step S402, the determination unit 114 determines whether the derived image item is a grid derived image item. If the result of this determination indicates that the derived image item is a grid derived image item, the sequence moves to step S403, whereas if the derived image item is not a grid derived image item, the sequence moves to step S405.

In step S405, the determination unit 114 determines whether the derived image item is an overlay derived image item. If the result of this determination indicates that the derived image item is an overlay derived image item, the sequence moves to step S406, whereas if the derived image item is not an overlay derived image item, the sequence moves to step S408.

Note that the determination processing in steps S401, S402, and S405 is specifically performed by checking the item type of the entry in the iinf box for the item indicated by the item_ID specified in the pitm box. If the item type is grid, the sequence moves to step S403, if the item type is iovl, the sequence moves to step S406, and if the item type is iden, the sequence moves to step S408. If the item type is another item type, the sequence moves to step S409.

In step S403, the processing unit 112 configures (arranges) the input images in the grid derived image based on the data structure of the grid derived image and the image size of the input images. The processing unit 112 then compares an output image size indicated by the data structure of the grid derived image with a total image size after the arrangement of the input images, which is calculated from the rows and columns in the grid and the size of the input images. The result of this comparison is a determination as to whether the output image size will become smaller than the total image size, i.e., whether the configuration is such that part of the input images will be trimmed to output the grid derived image.

If the result of this determination indicates that the configuration is such that part of the input images will be trimmed to output the grid derived image, the sequence moves to step S404. On the other hand, if the result of this determination indicates that the configuration will not trim part of the input images to output the grid derived image (the total image size and the output image size match), the sequence moves to step S409.

Note that the specifications do not allow for a case when the output image size is larger. In step S404, information indicating that the structure is capable of including privacy information in parts of images not displayed in the grid derived image is stored in the RAM 103, and the analysis results can be referenced in later processing.

In step S406, the processing unit 112 configures (arranges) the input images in an image overlay derived image, based on the data structure of the image overlay derived image and the image size of the input images. First, the processing unit 112 determines whether input images that extend beyond the canvas are configured, based on the output image (canvas) size and offset information applied to each input image, which indicate the data structure of the image overlay derived image, and the image size indicated by each input image. Next, the processing unit 112 determines whether input image parts that overlap are configured, based on the offset information applied to each input image, which indicates the data structure of the image overlay derived image, and the image size indicated by each input image.

If the results of these two determinations indicate that there is an input image corresponding to both of the determinations, the sequence moves to step S407. On the other hand, if neither of the images are configured in this manner in the two determinations, the sequence moves to step S409.

In step S407, the processing unit 112 stores, in the RAM 103, information indicating that the structure is capable of including privacy information in images in parts not displayed in the image overlay derived image, and the analysis results can be referenced in later processing.

In step S408, the processing unit 112 obtains the metadata of an image item referenced by an identity derived image. Specifically, the processing unit 112 obtains the item properties, item information, and the like, as well as item reference information, which is applied to images that serve as input images for the derived image item.

The determination processing of steps S401 to S403 and steps S405 to S407 is processing for the derived image item, but if the input image of a derived image is also a derived image, it is assumed that the same processing is performed on that input image.

In step S409, the determination unit 114 obtains the item property information of an image specified as a representative image item or an image to serve as an input image thereof, and determines whether a crop item property is applied thereto.

If the result of this determination indicates that the crop item property is applied, the sequence moves to step S410, whereas if the crop item property is not applied, the sequence moves to step S411.

In step S410, the processing unit 112 stores, in the RAM 103, information indicating that the structure applies cropping transform processing to the image specified in pitm to be displayed preferentially (priority display) or an input image of that derived image for display, and the analysis results can be referenced in later processing. Applying the cropping transform processing records an indication that the structure includes privacy information in an image corresponding to a part that is cropped and is therefore not displayed.

In step S411, the determination unit 114 determines whether an image of no relation to the display of an image item specified as the primary image is included. If the result of this determination indicates that an image of no relation to the display of an image item specified as the primary image is included, the processing moves to step S412. On the other hand, if the result of this determination indicates that an image of no relation to the display of an image item specified as the primary image is not included, the processing moves to step S413.

In this determination, the item reference information, the entity group information, and the like, of the image item specified in pitm is confirmed. In light of this, a thumbnail image item of the first priority image, an image item serving as an input image when the first priority image is a derived image, and so on are related, and therefore do not correspond thereto. On the other hand, if the first priority image and other image items are stored as the same group as an entity group, such as an image collection or slideshow, it is determined that an unrelated image item which has no effect on the output display for the first priority image is included.

In step S412, the generation unit 113 stores, in the RAM 103, identification information indicating that the structure includes an image that is not normally to be displayed, due to an image item which is not to be displayed being included in the HEIF file, and the analysis results can be referenced in later processing.

In step S413, the determination unit 114 determines whether an image presentation or an image sequence is included in the HEIF file. This is done by determining whether a moov box is stored based on the metadata stored in the HEIF file, and furthermore based on the handler type indicated by the hdlr box therein.

If the result of the determination indicates that an image presentation or an image sequence is included in the HEIF file, the sequence moves to step S414. On the other hand, if an image presentation or an image sequence is not included in the HEIF file, the sequence moves to step S415.

In step S414, the generation unit 113 generates, and stores in the RAM 103, identification information identifying that even if one of the images in the image sequence and the presentation is specified as the first priority image, information including privacy information may be present in another image (frame) in the image sequence and presentation. The identification information is stored in the RAM 103, and the analysis results can be referenced in later processing.

In step S415, the determination unit 114 determines whether metadata capable of storing desired text information is included in the HEIF file. Although this determination assumes determining whether the AccessibilityTextProperty, the UserDescriptionProperty, or the like, is stored, the metadata may be any other metadata capable of storing desired text information. For example, this may be metadata, or the like, defined by a standard aside from HEIF but that can be stored by HEIF.

If the result of the determination indicates that metadata capable of storing desired text information is included in the HEIF file, the sequence moves to step S416. On the other hand, if metadata capable of storing desired text information is not included in the HEIF file, the sequence moves to step S417.

In step S416, the generation unit 113 generates identification information making it possible to identify that the data structure is capable of including privacy information as desired text information and stores that identification information in the RAM 103, and the analysis results can be referenced in later processing.

In step S417, the determination unit 114 determines whether a region information item is associated with the image item. If the result of this determination indicates that a region information item is associated with the image item, the sequence moves to step S418. On the other hand, if a region information item is not associated with the image item, the sequence moves to step S421.

In step S418, the generation unit 113 generates identification information that makes it possible to identify that the structure may include privacy information which is not to be displayed or which is information extracted from a region, due to region information being associated with the image. The generation unit 113 then stores the generated identification information in the RAM 103, and the analysis results can be referenced in later processing.

In step S419, the determination unit 114 determines whether the associated region information is associated with an area outside the display frame of the image (an area not to be displayed). If the result of this determination indicates that the associated region information is associated with an area outside the display frame of the image, the sequence moves to step S420. On the other hand, if the associated region information is not associated with an area outside the display frame of the image, the sequence moves to step S421.

In step S420, the generation unit 113 generates identification information it makes it possible to identify that a region is designated to indicate an area outside the region to be displayed for the associated image, based on the coordinate information, size information, and the like, specified in the region information item. The generation unit 113 then stores the generated identification information in the RAM 103, and the analysis results can be referenced in later processing.

In step S421, the determination unit 114 determines whether an Exif data block including GPS information is included in the HEIF file. If the result of the determination indicates that an Exif data block including GPS information is included in the HEIF file, the sequence moves to step S422. On the other hand, if an Exif data block including GPS information is not included in the HEIF file, the sequence moves to step S304.

In step S422, the generation unit 113 generates identification information that makes it possible to identify that the structure is capable of including privacy information, due to GPS information being included in the Exif information stored in the HEIF file. The generation unit 113 then stores the generated identification information in the RAM 103, and the analysis results can be referenced in later processing. Although the present embodiment only describes the GPS information among the data included in the Exif information as being handled, other information may be handled instead. For example, data stored as Exif information, such as creator information or the like, may be specified individually, or the entirety of the Exif data may be handled.

In this manner, the HEIF file data structure analysis processing makes it possible to identify a structure that is capable of storing privacy information, for each type of structure. Although the present embodiment describes the foregoing analysis processing as enabling a determination including the type information, the type information in question may make it possible to identify several types at once, or determine a different type.

Returning to FIG. 3, next, in step S304, the determination unit 114 determines whether the file structure is a structure capable of storing privacy information, based on the analysis result obtained from the above-described metadata structure analysis processing. Specifically, it is determined whether the structure was determined to be capable of including privacy information in at least one of the determination steps of the analysis processing illustrated in the flowchart of FIGS. 4A to 4C.

Figure 4B:
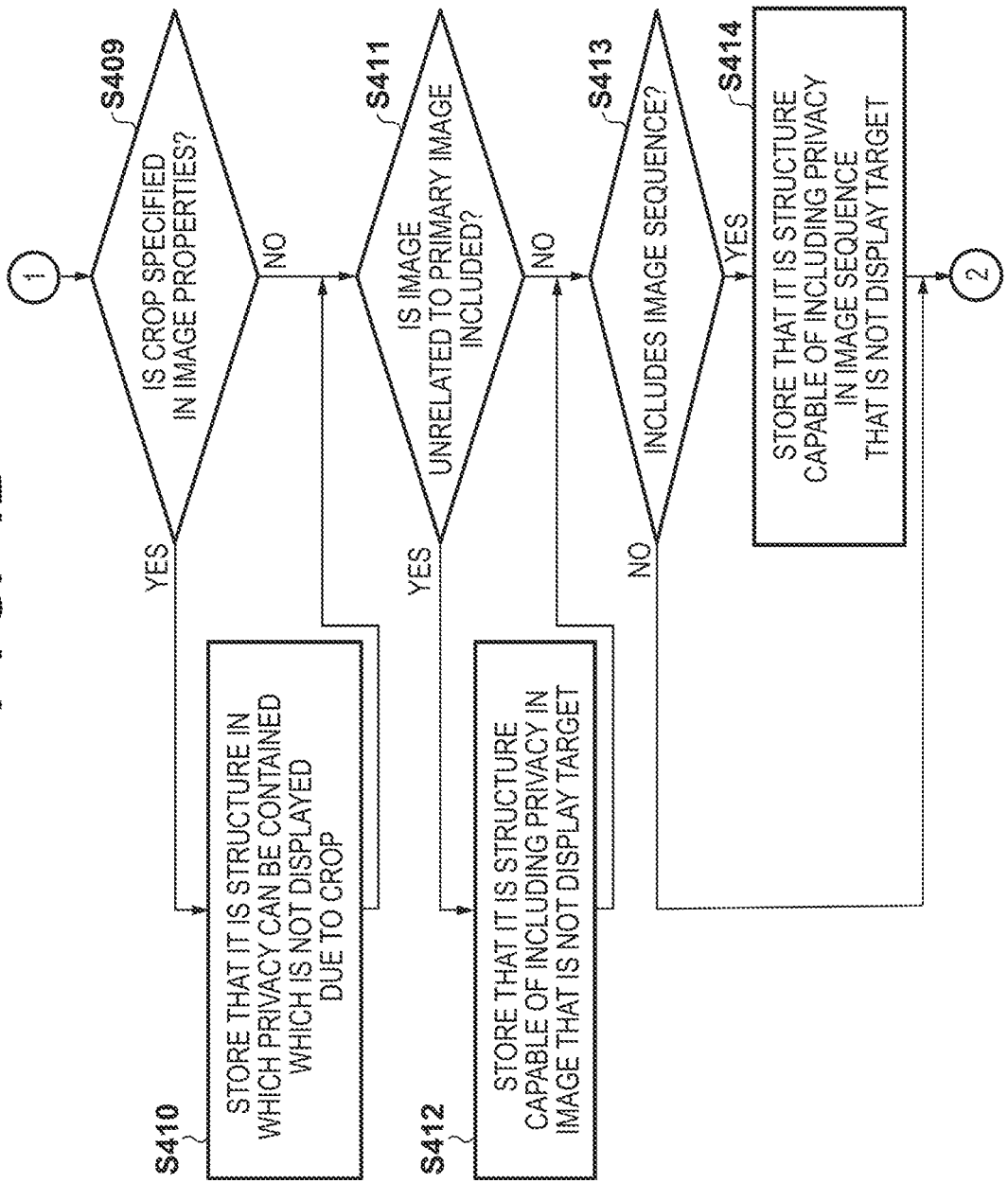
Figure 4C:
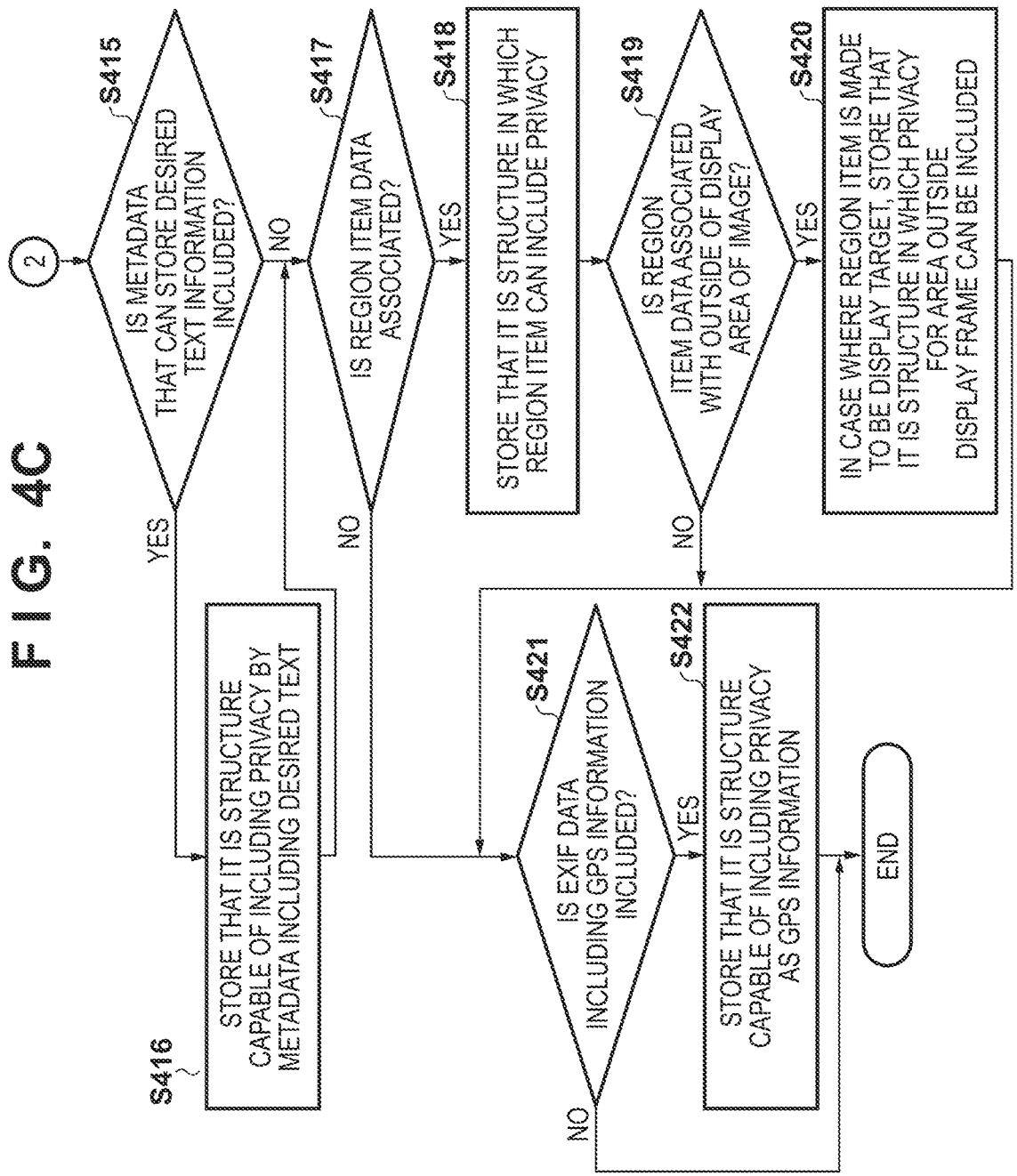

If the result of this determination indicates that the structure was determined to be capable of including privacy information in at least one of the determination steps in the analysis processing illustrated in the flowchart of FIGS. 4A to 4C, the sequence moves to step S305. On the other hand, if the structure was not determined to be capable of including privacy information in any of the determination steps in the analysis processing illustrated in the flowchart in FIGS. 4A to 4C, the processing illustrated in the flowchart of FIG. 3 ends.

Note that, even if the structure does not include any privacy information, the 'pctp' box 202 may be added to indicate that the analysis processing of step S303 has already been executed. In this case, zero is stored for entry_count.

In step S305, the generation unit 113 generates identification information, as metadata, from the identification information stored in the RAM 103 for each type of structure capable of including privacy information. More specifically, the PrivacyConsiderationTypeBox indicated in FIG. 6 is generated having been configured such that the corresponding type can be identified.

In step S306, the processing unit 112 adds the identification information to the metadata region as file-level metadata by inserting the identification information after the ftyp box. The processing unit 112 may also include a plurality of entries of the same factor in the information identified by the pctp box indicated in FIG. 6. For example, if there are a plurality of pieces of metadata including desired text information, the processing unit 112 may include an entry for each piece of metadata (property), or may include an entry for each image with which a property is associated.

In step S307, the processing unit 112 generates the HEIF file. More specifically, the processing unit 112 configures the final metadata of the HEIF file based on the above-described various types of information stored in the RAM 103. The processing unit 112 then concatenates the information in the 'ftyp' box 201, the information in the 'pctp' box 202, the information in the 'meta' box 203 storing the final metadata, the information in the 'moov' box 204, and the information in the 'mdat' box 205 storing the series of image data, region information data, and the like, which are related to the HEIF file. The HEIF file is generated as a result of this concatenation.

The CPU 101 then reads out the HEIF file generated in this manner from the RAM 103, and stores the read-out HEIF file in the non-volatile memory 110. Note that the output destination of the HEIF file is not limited to the non-volatile memory 110. For example, the CPU 101 may transmit the HEIF file to an external device through the communication unit 108, or store the file in a memory device different from the non-volatile memory 110.

In this manner, by analyzing the metadata stored in an image file and the data structure thereof, the image file generation apparatus 100 according to the present embodiment can easily identify whether the structure is capable of including privacy information by adding an indication thereof as metadata. It is also possible to identify which type of metadata and data structure can include the privacy information, for each type. Whether the structure is capable of including privacy information in the data stored in the image file can be easily identified from the identification information added as metadata.

Note that the image data stored in the HEIF file may include an HEIF file in which a single still image is stored, or may include a still image file such as a JPEG, or the like. Alternatively, the series of image data may be image data encoded in an HEIF file in which a plurality of still images are stored, or may be unencoded RAW image data.

Figure 12:
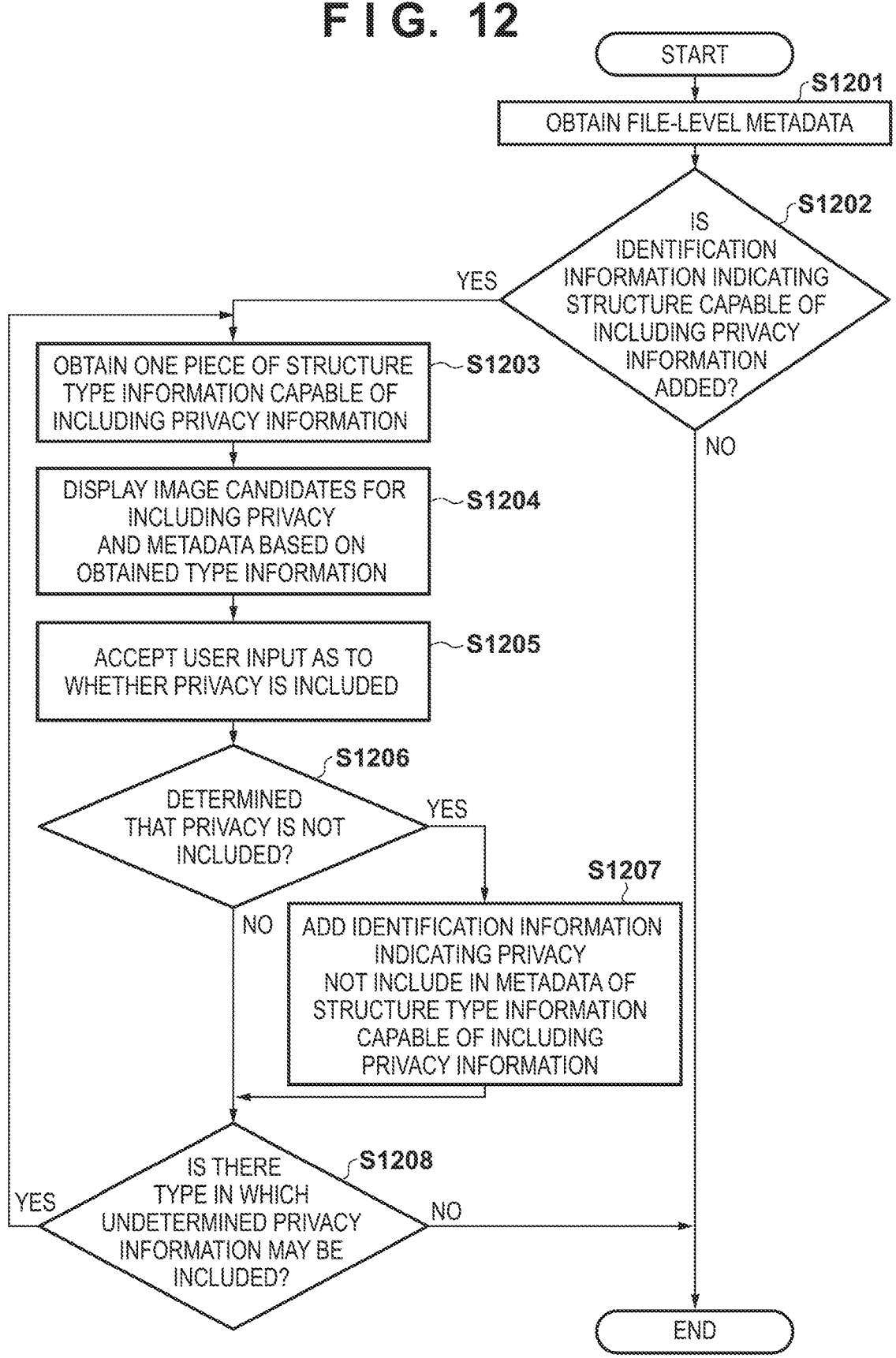
FIG. 12 is a flowchart illustrating file editing processing for changing metadata.

Editing processing performed by the image file generation apparatus 100 for editing an HEIF file having a file structure capable of storing privacy information will be described next with reference to the flowchart illustrated in FIG. 12.

Note that this editing processing will be described as processing in which the user determines whether privacy information is included by confirming an HEIF file in which metadata indicating that the structure is capable of storing privacy information is stored for each type. Note that whether information to be handled as privacy is included in the target data may be determined through image analysis, data analysis, or the like, instead of determination processing performed through a visual confirmation made by the user.

In step S1201, the CPU 101 obtains an HEIF file stored in the non-volatile memory 110. Note that the editing processing on the HEIF file according to this flowchart may be performed on an HEIF file in the RAM 103 before that file is output to the non-volatile memory 110 through the processing in the flowchart illustrated in FIG. 3. Additionally, in step S1201, the HEIF file is not limited to being obtained from the non-volatile memory 110, and the HEIF file may be received from an external device through the communication unit 108, for example. The CPU 101 then controls the processing unit 112 and obtains metadata stored at the file level. Specifically, the CPU 101 obtains the metadata information in the 'pctp' box 202 indicated in FIG. 2.

In step S1202, the determination unit 114 determines whether identification information indicating that the data structure is capable of including privacy information has been added. If the result of this determination indicates that identification information indicating that the data structure is capable of including privacy information has been added, the sequence moves to step S1203. On the other hand, if no identification information indicating that the data structure is capable of including privacy information is added, the sequence illustrated in the flowchart of FIG. 12 ends.

In the processing of step S1201, if no 'pctp' box 202 is stored, the analysis processing illustrated in the flowchart of FIGS. 4A to 4C may be executed to generate the information of the 'pctp' box 202.

In step S1203, the CPU 101 obtains one piece of structure type information capable of including privacy information. Specifically, the CPU 101 obtains entry information indicating the type included in the 'pctp' box 202.

In step S1204, the CPU 101 displays an image and metadata that are candidates for including privacy information in the display unit 106 (display control) based on the structure type information obtained in step S1203. Note that, if the no_privacy_flag indicated in definition 604 in FIG. 6 is set to one, the processing of step S1204 may be skipped, or a screen that makes it possible to identify that no privacy information is included may be displayed in the display unit 106 for re-confirmation.

Here, with reference to FIGS. 13, 14, 15, and 16, examples of image and metadata display screens displayed in the display unit 106 for each type capable of including privacy information (privacy_consideration type) will be described for each of the four types of type information indicated in the HEIF file example illustrated in FIGS. 5A and 5B.

Figure 13:
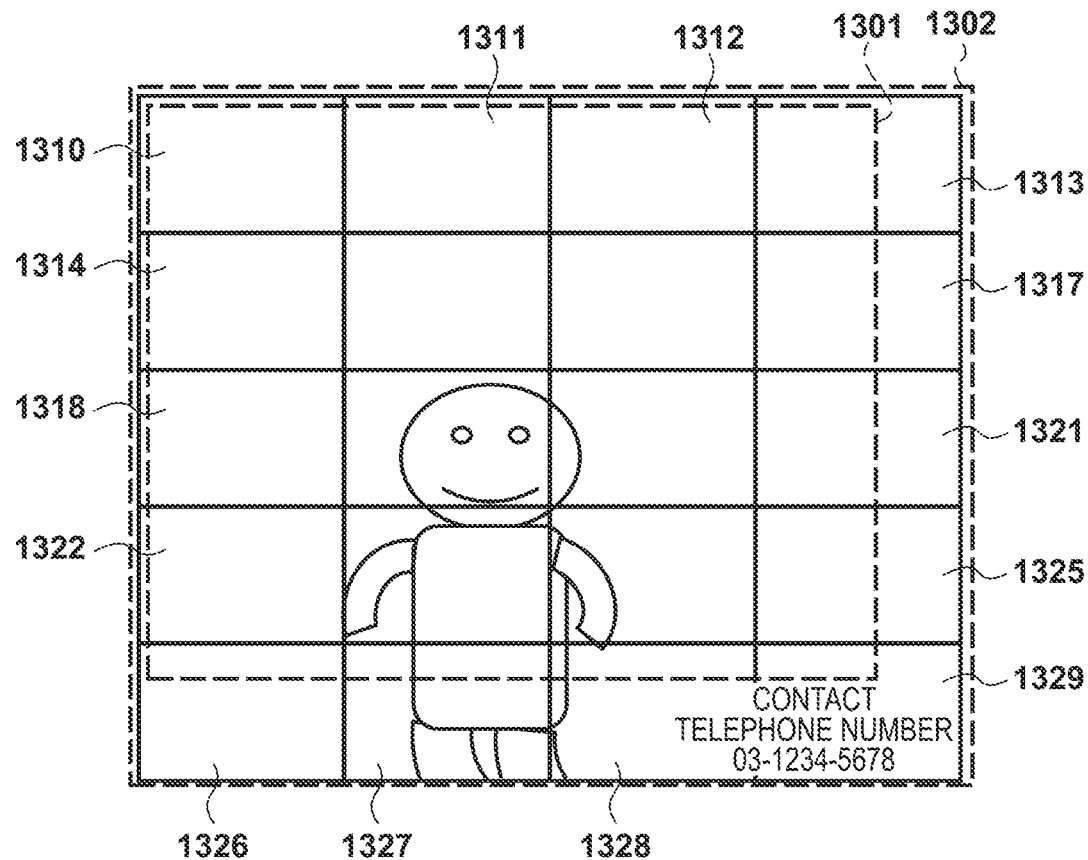
FIG. 13 is a diagram illustrating an example of an ImageGrid image.

The image illustrated in FIG. 13 is an example of a grid derived image for a UI display. A broken line 1301 indicates the range of the grid derived image output and displayed in a normal playback device. The image size indicated by this broken line 1301 is an image size obtained from the output_width and the output_height in the data structure of the grid derived image. The image size indicated by the broken line 1302 represents the image when the grid derived image is not cropped to the output image size, which is determined from the input image size for the grid derived image and the row and column information of the derived image. In the processing of step S1204, all the images in the broken line 1302 are to be displayed, and the broken line 1301 indicating the trimmed range is displayed in an identifiable manner. The input images for the grid derived image are arranged as indicated by 1310 to 1329, with grid lines being displayed to make the boundaries of each input image identifiable. As illustrated in FIG. 13, the input images are arranged in a grid to configure the grid derived image, and the trimmed region is displayed in an identifiable manner. This makes it possible for the user to determine whether privacy information is included in the partial image located between the broken line 1301 and the broken line 1302. In the image illustrated in FIG. 13, "contact telephone number" and "03-1234-5678" appear in the image in an identifiable form in part of the input image 1329, and the user therefore determines whether this information is information that must be considered privacy information.

Figure 14:
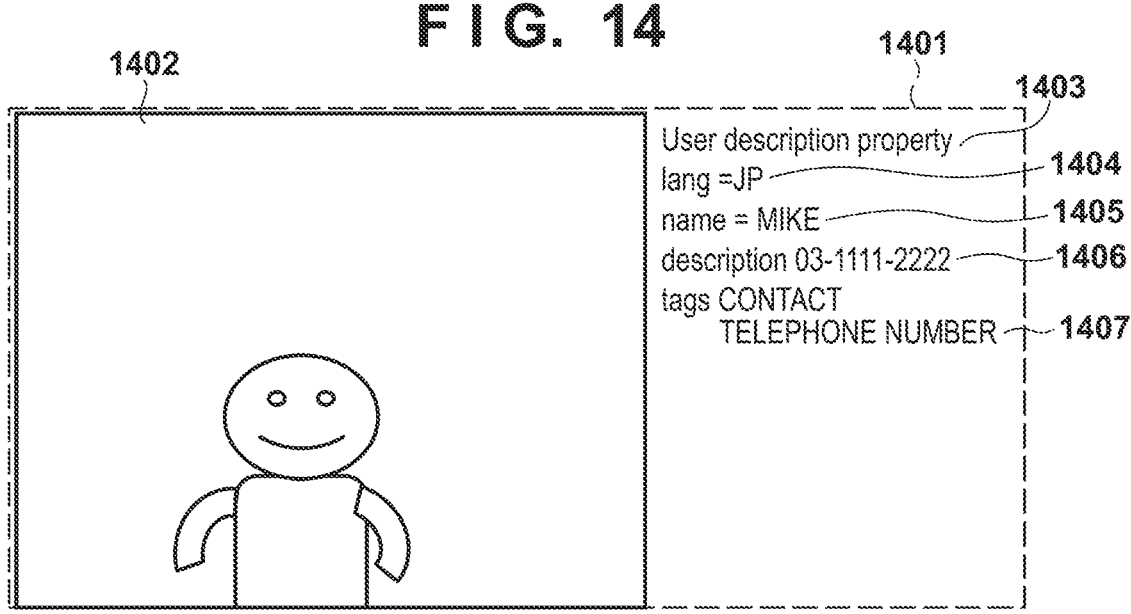
FIG. 14 is a diagram illustrating an example of an image including a UserDescriptionProperty.

Next, FIG. 14 illustrates an example of an image display indicating that a UserDescriptionProperty including desired text information to be displayed in the UI is included in the HEIF file. The range indicated by a broken line 1401 indicates the range of images and metadata displayed in the display unit 106. An image 1402 is an image specified in pitm. A description 1403 is the UserDescriptionProperty indicated in FIG. 8. A description 1404 indicates that lang in the annotation description information in UserDescriptionProperty is Japanese (JP). A description 1405 indicates that "Mike" is set for name. A description 1406 indicates that "03-1111-2222" is set for description, and a description 1407 indicates that "contact telephone number" is set for tags.

Figure 15:
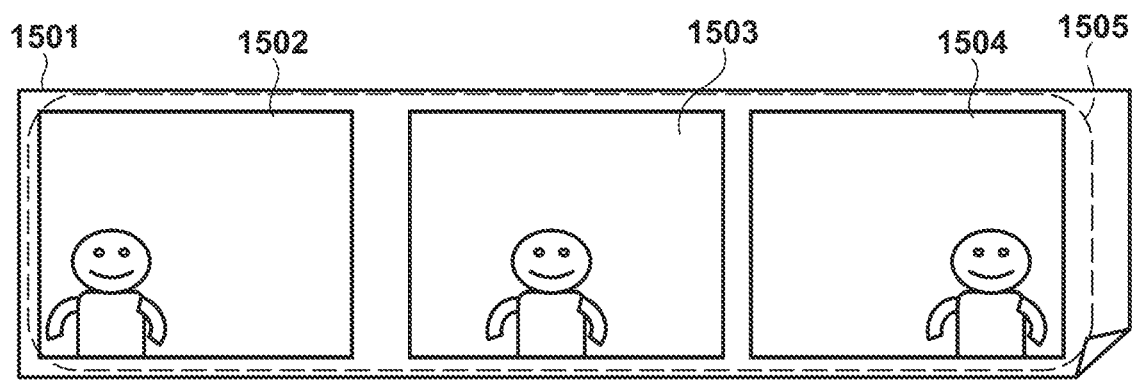
FIG. 15 is a diagram illustrating an example of an image sequence displayed during file editing processing.

Next, FIG. 15 illustrates an example of an image display indicating that the image sequence to be displayed in the UI is included in a HEIF file. A range 1501 indicates the display range of the image displayed in the display unit 106. Images 1502, 1503, and 1504 are images stored as the image sequence. A broken line 1505 indicates a unit by which this display is stored in the trak box of the description 233, and indicates that the unit is a single image sequence. If one of the images in the image sequence is extracted as an image item designated as PITM, that image may be displayed with emphasis or the like to be identifiable as such.

Figure 16:
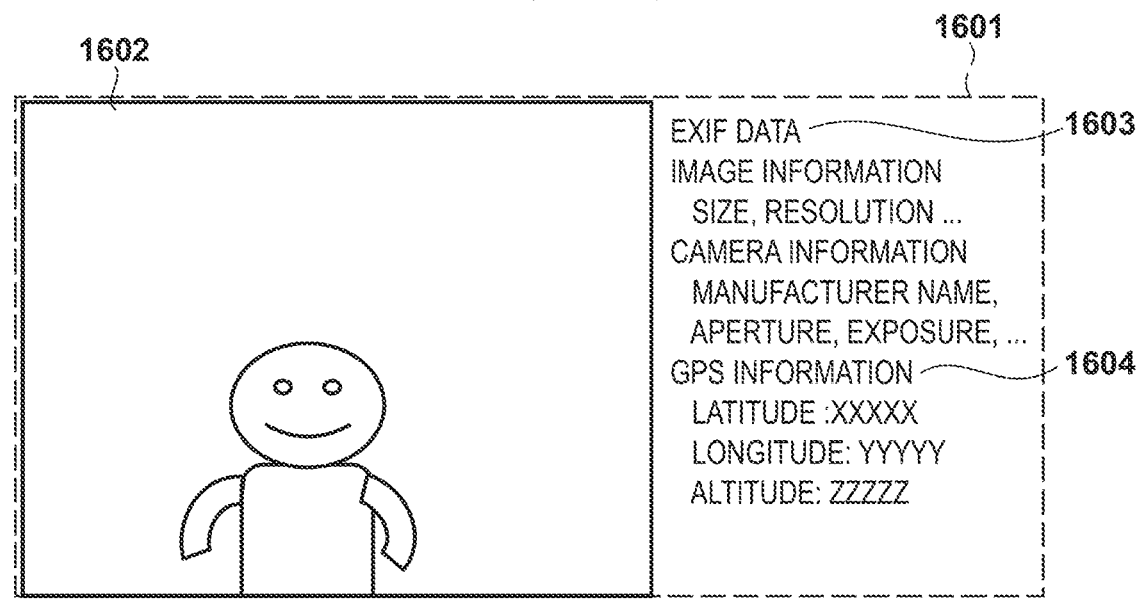
FIG. 16 is a diagram illustrating an example of an image including ExifGPS information displayed during file editing processing.

Next, FIG. 16 illustrates an example of an image display indicating that Exif data block information to be displayed in the UI is included in the HEIF file along with GPS information. The range indicated by a broken line 1601 indicates the range of images and Exif data displayed in the display unit 106. An image 1602 is an image specified in pitm. A description 1603 is capturing information stored as Exif data, and includes image information, manufacturer name information relating to the camera serving as the equipment that captured the image, image capture conditions such as aperture and exposure, and the like.

Note that, in this display example, not all information is fully displayed, and thus the display may be switched as appropriate. Information 1604 indicates the GPS information included in the Exif data. This is displayed as information which makes it possible to specify the location where the image included in the HEIF file was captured.

Figure 17:
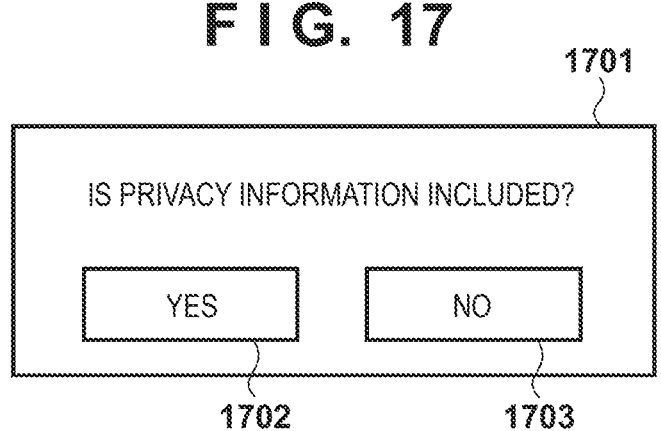
FIG. 17 is a diagram illustrating an example of a selection User Interface (UI) display during file editing processing.

Next, the user operates the operation input unit 107 to make an input indicating whether the information displayed by the image file generation apparatus 100 in the display unit 106 includes privacy information. The display unit 106 displays an input screen, such as that illustrated in FIG. 17, as input processing performed at this time. The CPU 101 displays a console 1701 and the display unit 106 along with the images illustrated in FIGS. 13 to 16, and by operating the operation input unit 107, the user selects a "yes" button 1702 or a "no" button 1703 in accordance with the content. Accordingly, in step S1205, the CPU 101 accepts a selection operation made by the user.

In step S1206, the CPU 101 determines whether the user has selected the "yes" button 1702 ("privacy information is included" has been selected), or selected the "no" button 1703 ("privacy information is not included" has been selected), by operating the operation input unit 107.

If the result of this determination indicates that the user has selected the "yes" button 1702 by operating the operation input unit 107 ("privacy information is included" has been selected), the sequence moves to step S1208. On the other hand, if the user has selected the "no" button 1703 by operating the operation input unit 107 ("privacy information is not included" has been selected), the sequence moves to step S1207. The no_privacy_flag information is not changed.

In step S1207, the CPU 101 adds information making it possible to identify that the metadata of the structure type information, which can include privacy information, does not include privacy information. Specifically, the CPU 101 sets the no_privacy_flag information corresponding to the privacy_consideration type stored in the determined 'pctp' box 202 to 1.

In step S1208, the CPU 101 confirms whether the determination has been made for all the structure information capable of including privacy information. If the result of this confirmation indicates that there is an undetermined type that can include privacy information, the sequence moves to step S1203, whereas if the determination has been made for all the structure information capable of including privacy information, the processing illustrated in the flowchart of FIG. 12 ends.

Although the present embodiment describes checking a single piece of image data or metadata for each type, some structure types may store factors that can include a plurality of pieces of privacy information, and thus the check may be performed for each factor. A plurality of entries of the same factor may also be included in the information identified by the 'pctp' box 202 indicated in FIG. 6.

In this manner, with the image file generation apparatus 100 according to the present embodiment, for image data or metadata determined to have a structure capable of including privacy information, identification information is stored as metadata for each type thereof. Furthermore, adding a result of confirming whether privacy information is actually included for each type makes it possible not only to indicate that the structure is capable of storing privacy information, but also to easily identify whether the privacy information is included at the file level. This makes it possible to easily confirm what type of data includes the privacy information in the image file. This also makes it easy to delete such privacy information later as necessary.

Playback processing performed by the image file generation apparatus 100 for playing back (displaying) an HEIF file generated as described above will be described next with reference to the flowchart illustrated in FIGS. 20A and 20B. Note, however, that the device that plays back the HEIF file is not limited to the image file generation apparatus 100.

Note that this playback processing will be described as being started, for example, when an operation input for instructing the HEIF file to be played back is detected in a state in which the image file generation apparatus 100 is set to a playback mode.

In step S2001, the CPU 101 obtains an HEIF file for playback (a target file), for which a playback instruction has been made. Specifically, in step S2001, the CPU 101 reads out (obtains), from the RAM 103, an HEIF file, among the HEIF files stored in the non-volatile memory 110, which has been designated to be played back (instructed to be played back) by the user operating the operation input unit 107. Note that the method for obtaining the HEIF file to be played back in the RAM 103 is not limited to any specific method. For example, an HEIF file, among a group of HEIF files stored in a server on a network, which has been designated to be played back (instructed to be played back) by the user operating the operation input unit 107, may be received from the server through the communication unit 108 and obtained in the RAM 103.

In step S2002, the CPU 101 obtains the metadata from the HEIF file obtained in step S2001, and the processing unit 112 obtains the structure of the HEIF file by analyzing the obtained metadata.

In step S2003, the CPU 101 specifies a representative item based on the information in the 'pitm' box 212 of the metadata obtained in step S2002. Then, the encoding/decoding unit 111 decodes the encoded data 241 of the representative item, and obtains and decodes the corresponding encoded data from the metadata relating to the image item specified for the representative image.

In step S2004, the CPU 101 stores the various types of data decoded in step S2003 in a predetermined buffer in the RAM 103. Hereafter, the image data of the representative item decoded and stored in the predetermined buffer of the RAM 103 will be called "representative image data".

In step S2005, the determination unit 114 determines whether identification information indicating that the structure is capable of including privacy information in the metadata has been added. If the result of this determination indicates that identification information has been added, the sequence moves to step S2006, whereas if identification information has not been added, the sequence moves to step S2011. Specifically, it is determined whether the 'pctp' box 202 has been added to the file-level metadata of the HEIF file. Such metadata is added if the HEIF file was output through the image file generation processing illustrated in the flowchart in FIG. 3, but an HEIF file generated through a method aside from that described in the present embodiment does not have such data. Accordingly, if the 'pctp' box 202 is not added, in step S2011, the CPU 101 performs metadata structure analysis processing. The processing performed in step S2011 is the same as the processing performed in the above-described step S303, and is processing that follows the flowchart in FIGS. 4A to 4C.

In step S2012, the determination unit 114 determines whether the file structure is determined to be capable of including privacy information as a result of the analysis processing performed in step S2011.

If the result of this determination indicates that the file structure is capable of including privacy information, the sequence moves to step S2014, whereas if the file structure is not capable of including privacy information, the sequence moves to step S2013.

In step S2013, the CPU 101 displays, in the display unit 106, the representative image data stored in the buffer in step S2004. In step S2006, the CPU 101 obtains structure type information capable of including privacy information. Specifically, this is the identification information stored in the 'pctp' box 202.

In step S2007, the determination unit 114 determines whether identification information indicating that no privacy information is included is added to all types. Specifically, the determination unit 114 determines whether no_privacy_flag is 1 for each piece of privacy_consideration type information added to each entry_count. Furthermore, the determination unit 114 determines whether the entry_count stored in the 'pctp' box 202 is 0.

If the result of this determination indicates that one is set for all no_privacy_flags or that the entry_count stored in the 'pctp' box 202 is zero, it is determined that no privacy information is included, and the sequence moves to step S2013. On the other hand, if it is determined that privacy information is included, the sequence moves to step S2008.

In step S2008, the determination unit 114 determines whether identification information indicating that no privacy information is included is added to any one specified type. If the result of this determination indicates that identification information has been added to any one specified type, the sequence moves to step S2009, whereas if identification information has not been added to any one specified type, the sequence moves to step S2014. This corresponds to a case when a value of at least one is specified in the entry_count of the 'pctp' box 202, and none of the no_privacy_flags is set to 1. In this case, the file is handled as an HEIF file that has the structure capable of including privacy information illustrated in FIG. 12, but for which editing processing that determines that no privacy information is included has not been performed. On the other hand, if any identification information indicated that no privacy information is included, added to type information indicating a structure capable of including privacy information, has been determined not to include privacy information, the sequence moves to step S2009. Specifically, this corresponds to a case when any one of the no_privacy_flags for the number indicated by entry_count is set to one, and another is set to zero. In this case, the determination processing for determining whether the privacy information illustrated in FIG. 12 is performed and the file is handled as an HEIF file, and it is not determined that not even one piece of privacy information is included, the file is handled as a file that includes privacy information.

In step S2009, the CPU 101 generates, for each type, identification display information indicating that privacy information is included. In step S2010, the CPU 101 displays the identification display information generated in step S2009, and the representative image data stored in the buffer in step S2004, in the display unit 106.

In step S2014, the CPU 101 generates, for each type, identification display information indicating that the file structure is capable of including privacy information.

In step S2015, the CPU 101 displays the identification display information generated in step S2014, and the representative image data stored in the buffer in step S2004, in the display unit 106.

FIG. 21 illustrates an example of the display of the type identification display information displayed along with the representative image data in step S2010 or step S2015. FIG. 21 illustrates an example of a UI screen displayed in step S2010 or step S2015.

A broken line 2101 indicates the entire UI screen, and includes representative image data 2102. Images 2103 and 2104 are examples of identification display images for corresponding structure types. The image 2103 indicates that the left and right parts of the image are not displayed as a result of a grid image being trimmed, and has information equivalent to that of the image illustrated in FIG. 13. Additionally, the image 2104 indicates that an image sequence is included in the HEIF file, and has information equivalent to that of the image illustrated in FIG. 15. Displaying these displays along with the representative image data makes it possible to identify, through the UI display, that privacy information may be included in the HEIF file.

For the UI display in step S2010 and the UI display in step S2015, it is assumed that, for example, the display colors are switched, such as by displaying the images 2103 and 2104 in a red frame in step S2010, and displaying the images 2103 and 2104 in a yellow frame in step S2015. In other words, this means that the display color is switched such that in step S2010, it is possible to identify that the file includes privacy information, and in step S2015, it is possible to identify that the file may include privacy information. In addition to changing the color of the frame, the display may be switched by displaying icons or the like.

Figure 18:
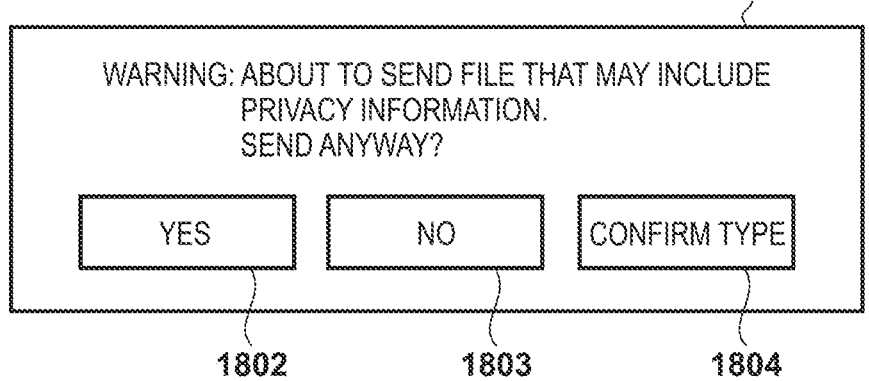
FIG. 18 is a diagram illustrating an example of a UI display for displaying a warning that a structure includes privacy information when transmitting an image file.
Figure 19:
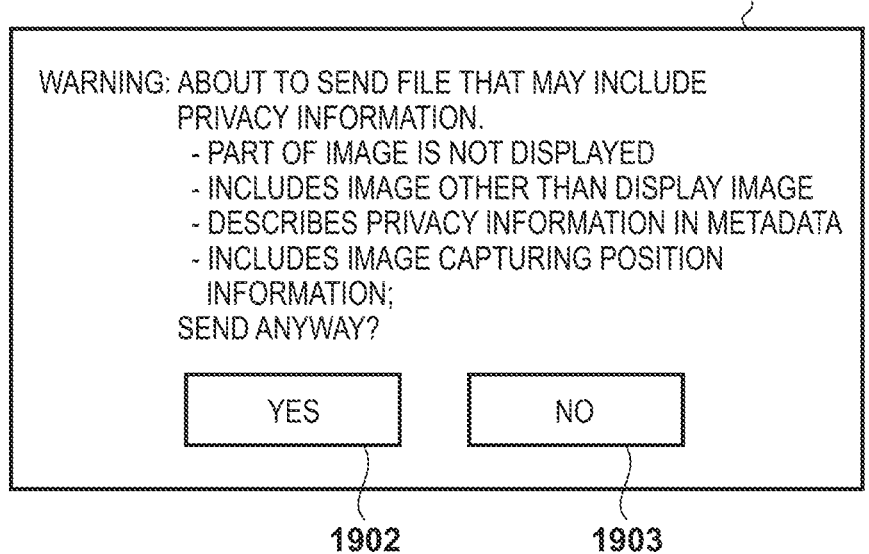
FIG. 19 is a diagram illustrating an example of a UI display for displaying a warning that a structure includes privacy information, along with type information, when transmitting an image file.
Figure 20A:
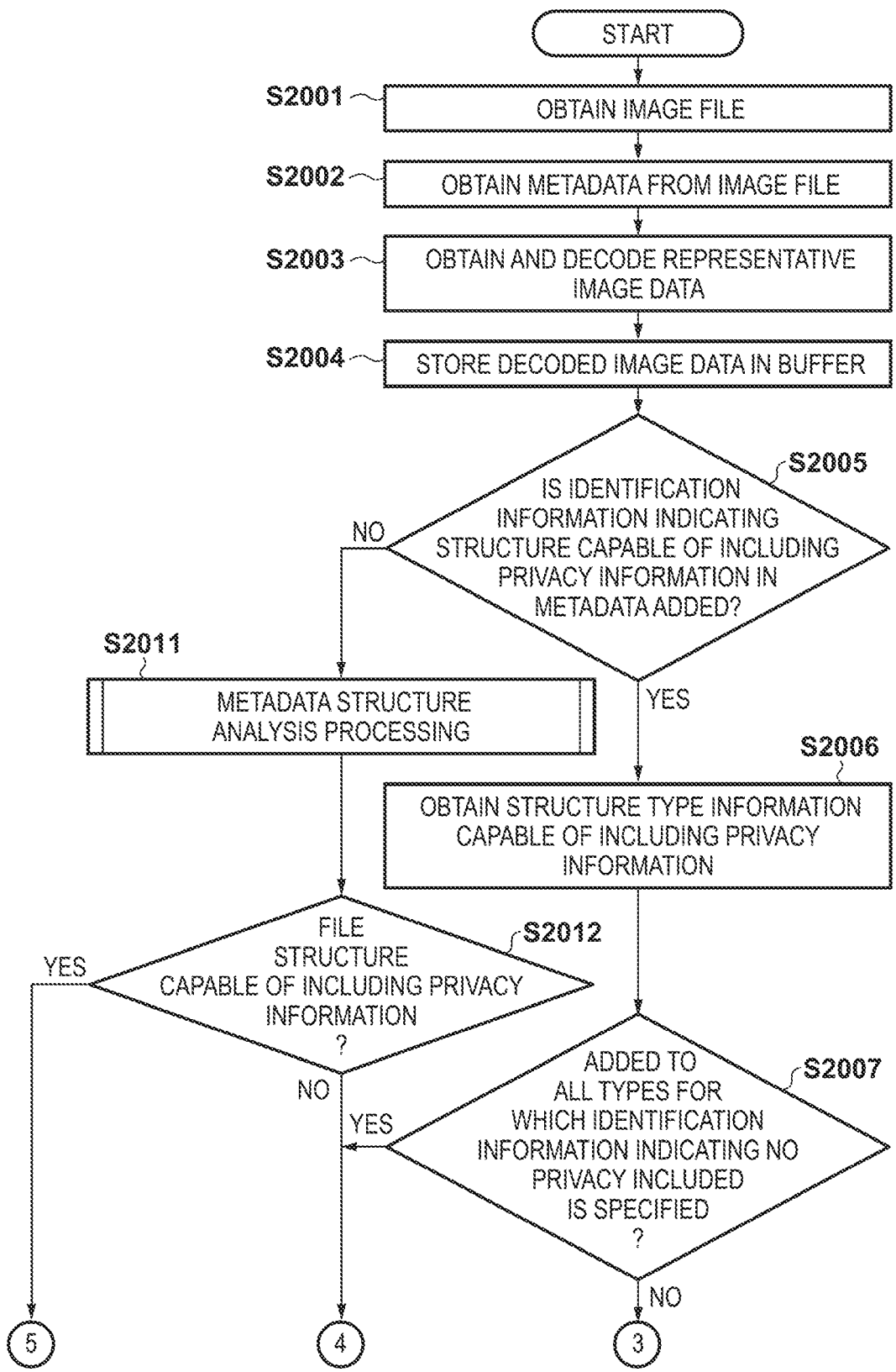
FIGS. 20A and 20B are a flowchart illustrating image file playback processing.
Figure 20B:
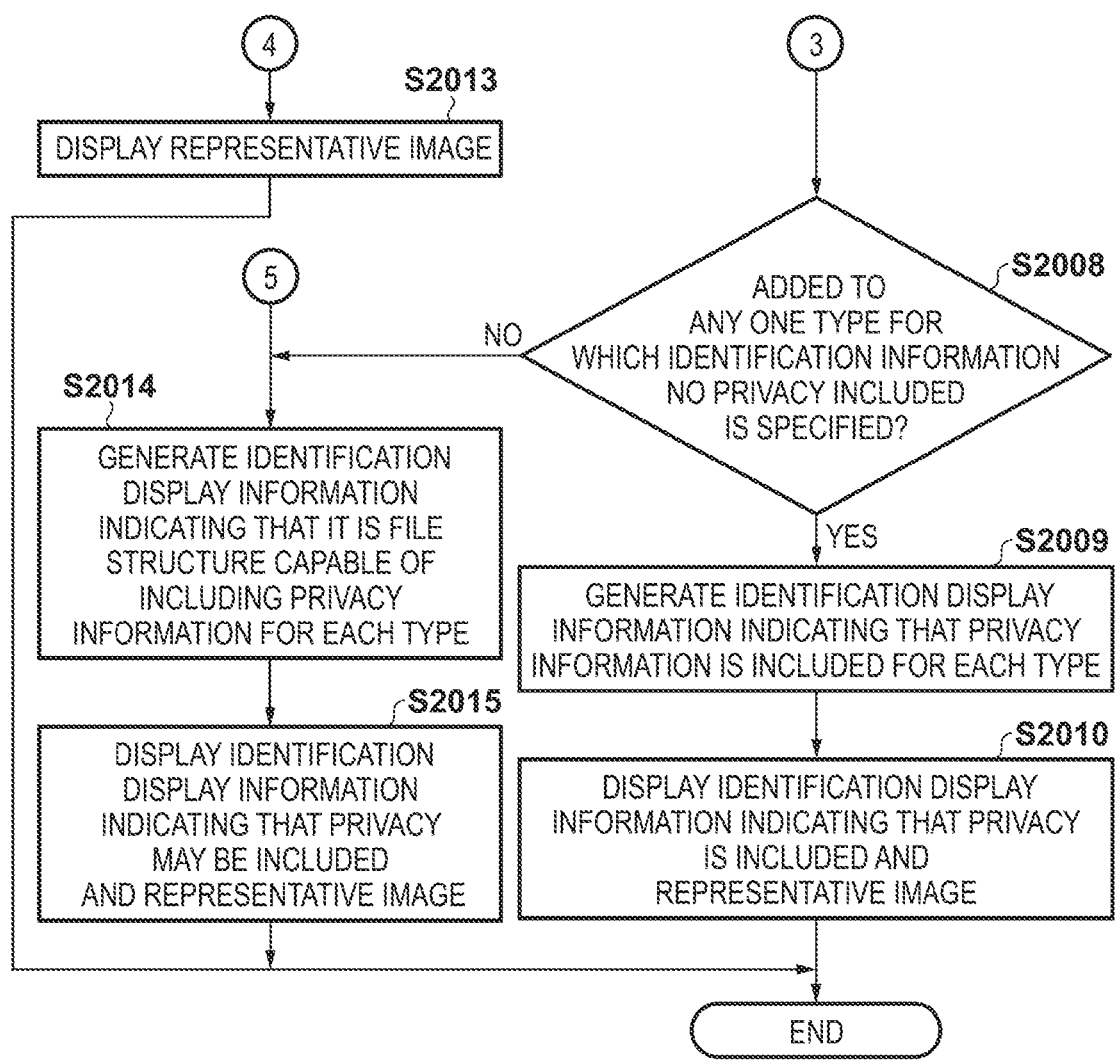

The processing illustrated in FIGS. 20A and 20B has been described as processing for displaying an image along with a representative image. As another form, FIGS. 18 and 19 illustrate an example of the display when similar processing is performed on an HEIF file, and a dialog box serving as a warning display is displayed instead of displaying a representative image along with the image. For example, when such an HEIF file is to be transmitted over a network, such a dialog box can be used to make a warning display for the user to confirm before transmitting the file.

In FIG. 18, a dialog box 1801 is a dialog box displayed when displaying a warning. A text display indicating the warning is provided in the dialog box 1801. A button 1802 is a UI button for entering an indication that it is acceptable to continue the processing even with such a file. A button 1803 is a UI button for canceling processing such as transmission, for example. Selecting a button 1804 corresponds to selecting to display type information indicating what type of information is included.

In FIG. 18, UI buttons for displaying the type information separately are provided in this manner, but in FIG. 19, the warning display dialog box itself includes a text description that makes it possible to identify the type information from the beginning.

Text information capable of identifying a structure type in which privacy information can be included in the HEIF file is written in a dialog box 1901 as a text display. A button 1902 is a UI button similar to the button 1802. A button 1903 is a UI button similar to the button 1803.

Operations made on the dialog box 1801 illustrated in FIG. 18 and the dialog box 1901 illustrated in FIG. 19 (e.g., operations for selecting UI buttons) are performed by the user operating the operation input unit 107, for example.

Although the present embodiment describes displaying the dialog box when transferring an image over a network, or the like, the display is not limited thereto, and a UI display that enables similar identification may be made by displaying an icon indicating a file. Additionally, identification information that enables identification may be stored as a UI screen. Such a warning may also be displayed when changing access rights of image files stored in storage on the network, such as in the cloud. For example, a case is conceivable in which the file is moved from the private access region to a public region in the cloud, or in which the access rights are changed to public access. It is also conceivable to make such a display when a change is made to the users who can access the image file.

Additionally, according to the present embodiment, when using an image file in which a plurality of pieces of image data are stored in association with metadata, it is easy to determine whether the file is configured as a file having a structure capable of including privacy information in data which is not to be displayed with the first priority. Additionally, by making it possible to identify a structure type which is capable of including privacy information, it is possible to determine what type of data structure can include privacy information, which makes it easy to confirm whether privacy information is actually included. Furthermore, even if the structure is capable of including privacy information, indicating that the file has already been determined not to include privacy information eliminates the need to determine whether privacy information is included each time the image file is used. Additionally, the image file can be reconstructed as necessary by using the identification information indicating structures that may include privacy information, a result indicating that a determination has already been made, and so on. Specifically, it is conceivable to delete a structure that includes privacy information, transcode the image to delete part of the image from the image file, and so on. In addition to deleting the image file, it is conceivable to control the transmission of the image file over the network so that only that image file is not transmitted. Similarly, it is possible to keep the original image file and reconstruct the image file only with data that does not include privacy information.

Although the present embodiment has described the metadata indicating that the structure can include privacy information, which is stored in the image file, as being generated when the image file is generated, the configuration is not limited thereto. For example, the result of analysis processing performed at a different time, when using or editing the generated image file, may be added to the image file as the metadata. In this case, even if the structure is capable of including privacy information, the file may be determined not to include privacy information at the same time. More specifically, for example, the structure of the image data and the metadata already stored in the image file may be analyzed, and the user may be allowed to determine whether privacy information is included in sequence.

Additionally, in the present embodiment, even if content including privacy information appears in an image part that is not normally displayed, identification information is not added to such content, but the user may be allowed to determine whether privacy information is included in such a type as well.

Second Embodiment

The image file generation apparatus 100 described in the first embodiment may be constituted by a single device, or may be constituted by a plurality of devices. In the latter case, each device need not have the same configuration. In this case, the image file generation apparatus 100 may be, for example, a set of devices each having its own role, such as at least one device that executes processing according to the above-described flowcharts, a device that functions as storage, and the like.

The numerical values, the processing timing, the processing order, the entities performing the processing, the configuration/obtainment method/destination/source/storage location of data (information), and the like, used in the embodiments described above have been given as examples for the purpose of providing detailed descriptions, and are not intended to be limited to such examples.

Additionally, some or all of the embodiments described above may be combined as appropriate. Furthermore, some or all of the embodiments described above may be used selectively.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that processes an image file having a structure that includes a plurality of pieces of image data and metadata relating to the plurality of pieces of image data, the image processing apparatus comprising:
a determining unit configured to determine whether the structure is a file structure in which privacy information can be included in data, among the plurality of pieces of image data and the metadata, that is not to be displayed at a first priority; and
a display control unit configured, when the determining unit determines that the structure is a file structure in which privacy information can be included in the data, to display identification information capable of identifying the structure as a file structure in which privacy information can be included in the data.

2. The image processing apparatus according to claim 1, wherein the identification information further includes type information capable of identifying what type of privacy information the file structure is capable of including.

3. The image processing apparatus according to claim 2, wherein the type information is information indicating that image data, which is not to be displayed at the first priority, is included.

4. The image processing apparatus according to claim 3, wherein the type information is information indicating that derived image data or an image part not to be displayed due to conversion is included.

5. The image processing apparatus according to claim 3, wherein the type information is an image sequence that is not specified to be displayed at the first priority.

6. The image processing apparatus according to claim 3, wherein the type information is metadata capable of storing any text information.

7. The image processing apparatus according to claim 6, wherein the text information is alternative text information.

8. The image processing apparatus according to claim 6, wherein the text information is annotation information added to description information of a user and region information.

9. The image processing apparatus according to claim 2, wherein the type information is data of a region associated with outside an area of an image to be displayed.

10. The image processing apparatus according to claim 2, wherein the type information is information indicating that the metadata includes position information.

11. The image processing apparatus according to claim 1, wherein the identification information is attached to the image file as metadata at a file level.

12. The image processing apparatus according to claim 1, wherein the identification information is information displayed in a user interface when displaying any of the data in the image file.

13. The image processing apparatus according to claim 1, wherein the identification information is displayed as a warning when transmitting the image file outside.

14. The image processing apparatus according to claim 1, further comprising
a unit configured, when an instruction to transfer the image file over a network is received, to display a warning indicating that a file which may include privacy information is about to be transferred, when the file structure is a file structure in that privacy information can be included in the image file.

15. A non-transitory computer-readable storage medium having recorded thereon a computer program for causing a computer to function as each unit of the image processing apparatus according to claim 1.

16. An image processing apparatus that generates an image file having a structure including a plurality of pieces of image data and metadata relating to the plurality of pieces of image data, the image processing apparatus comprising:
    a determining unit configured to determine whether the structure is a file structure in which privacy information can be included in data, among the plurality of pieces of image data and the metadata, that is not to be displayed at a first priority; and
    a generating unit configured, when the determining unit determines that the structure is a file structure in which privacy information can be included in the data, to generate the image file by adding, to the image file as metadata, identification information capable of identifying the structure as a file structure in which privacy information can be included in the data.

17. The image processing apparatus according to claim 16, wherein the generating unit further adds metadata indicating that no privacy information is included to the image file when it is determined that no privacy information is included, even if the file structure is capable of including privacy information.

18. A non-transitory computer-readable storage medium having recorded thereon a computer program for causing a computer to function as each unit of the image processing apparatus according to claim 16.

19. An image processing method performed by an image processing apparatus, the image processing apparatus processing an image file having a structure including a plurality of pieces of image data and metadata relating to the plurality of pieces of image data, and the image processing method comprising:
    determining whether the structure is a file structure in which privacy information can be included in data, among the plurality of pieces of image data and the metadata, that is not to be displayed at a first priority; and
    when it is determined in the determining that the structure is a file structure in which privacy information can be included in the data, displaying identification information capable of identifying the structure as a file structure in which privacy information can be included in the data.

20. An image processing method performed by an image processing apparatus, the image processing apparatus generating an image file having a structure including a plurality of pieces of image data and metadata relating to the plurality of pieces of image data, and the image processing method comprising:
    determining whether the structure is a file structure in which privacy information can be included in data, among the plurality of pieces of image data and the metadata, that is not to be displayed at a first priority; and
    when it is determined in the determining that the structure is a file structure in which privacy information can be included in the data, generating the image file by adding, to the image file as metadata, identification information capable of identifying the structure as a file structure in which privacy information can be included in the data.

* * * * *